(12) United States Patent
Roskowski et al.

(10) Patent No.: US 7,609,650 B2
(45) Date of Patent: Oct. 27, 2009

(54) COLLECTION OF DATA AT TARGET WIRELESS DEVICES USING DATA COLLECTION PROFILES

(75) Inventors: Steve Roskowski, Morgan Hill, CA (US); David Kolm, Los Altos, CA (US); Michael P. Ruf, Parkland, FL (US); James R. Jaquet, Campbell, CA (US); Konstantin Othmer, Mountain View, CA (US)

(73) Assignee: Carrier IQ, Inc., Mountain View, CA (US)

( * ) Notice: Subject to any disclaimer, the term of this patent is extended or adjusted under 35 U.S.C. 154(b) by 558 days.

(21) Appl. No.: 11/175,857

(22) Filed: Jul. 5, 2005

(65) Prior Publication Data

US 2006/0007870 A1    Jan. 12, 2006

Related U.S. Application Data

(60) Provisional application No. 60/586,480, filed on Jul. 8, 2004.

(51) Int. Cl.
*H04L 12/26* (2006.01)
(52) U.S. Cl. ..................... 370/252; 370/241
(58) Field of Classification Search .............. 714/26, 714/37, 31; 379/21, 10, 12, 22, 50; 709/223–224, 709/182; 455/419, 425, 466; 370/252, 241, 370/328
See application file for complete search history.

(56) References Cited

U.S. PATENT DOCUMENTS

| | | | |
|---|---|---|---|
| 5,285,494 A | 2/1994 | Sprecher et al. | |
| 5,408,218 A | 4/1995 | Svedberg et al. | |
| 5,889,474 A | 3/1999 | LaDue | |
| 6,012,152 A * | 1/2000 | Douik et al. | ............ 714/26 |
| 6,097,336 A | 8/2000 | Stilp | |
| 6,167,358 A | 12/2000 | Othmer et al. | |
| 6,205,326 B1 | 3/2001 | Tell et al. | |
| 6,233,449 B1 | 5/2001 | Glitho et al. | |
| 6,266,788 B1 | 7/2001 | Othmer et al. | |
| 6,442,547 B1 | 8/2002 | Bowman-Amuah | |
| 6,477,373 B1 | 11/2002 | Rappaport et al. | |
| 6,516,189 B1 | 2/2003 | Frangione et al. | |
| 6,516,198 B1 | 2/2003 | Tendler | |
| 6,529,136 B2 | 3/2003 | Cao et al. | |
| 6,556,659 B1 | 4/2003 | Bowman-Amuah | |

(Continued)

OTHER PUBLICATIONS

"Accelerate cdma2000 Performance with Agilent's Wireless Network Solutions", Agilent Technologies, Inc., Aug. 26, 2002.

(Continued)

*Primary Examiner*—Ricky Ngo
*Assistant Examiner*—David Oveissi
(74) *Attorney, Agent, or Firm*—Workman Nydegger

(57) ABSTRACT

Systems and methods for defining and using a data collection profile in connection with a telecommunications network that includes multiple devices. Initially, a query is defined that concerns one or more aspects of the communications network. The query is then used as a basis for building a data collection profile. Next, a set of target devices is selected based upon criteria relating to the query. The data collection profile is then provided to the target devices which collect data in accordance with the data collection profile. Finally, the collected data is transmitted to a service platform for further processing.

35 Claims, 10 Drawing Sheets

U.S. PATENT DOCUMENTS

| | | | |
|---|---|---|---|
| 6,745,011 B1 | 6/2004 | Hendrickson et al. | |
| 6,788,926 B1 | 9/2004 | Frangione et al. | |
| 6,807,416 B2 | 10/2004 | Nyholm | |
| 6,807,515 B2 | 10/2004 | Vogel et al. | |
| 6,918,108 B2 | 7/2005 | Rajaram | |
| 6,928,280 B1 | 8/2005 | Xanthos et al. | |
| 6,941,202 B2 | 9/2005 | Wilson et al. | |
| 7,013,136 B2 | 3/2006 | Frangione et al. | |
| 7,092,707 B2 | 8/2006 | Lau et al. | |
| 7,194,538 B1 * | 3/2007 | Rabe et al. | 709/224 |
| 7,197,304 B2 | 3/2007 | Chung et al. | |
| 7,281,041 B2 * | 10/2007 | Daggett | 709/224 |
| 7,324,815 B2 | 1/2008 | Ross et al. | |
| 7,328,260 B1 * | 2/2008 | Muthiyan et al. | 709/224 |
| 2002/0049053 A1 | 4/2002 | Nomura et al. | |
| 2002/0069037 A1 | 6/2002 | Hendrickson et al. | |
| 2002/0072359 A1 * | 6/2002 | Moles et al. | 455/425 |
| 2002/0091636 A1 | 7/2002 | Bullard et al. | |
| 2003/0159088 A1 | 8/2003 | Phillips et al. | |

OTHER PUBLICATIONS

"Communication Test Equipment XPI Solutions for Wireless Networks, GSM/GPRS and UMTS Networks", Agilent Technologies, Inc., Mar. 14, 2003.
"Agilent E6476A/E6478A Air Interface Remote Monitoring System, Product Overview", Agilent Technologies, Inc., Feb. 24, 2003.
http://www.casabyte.com/default.asp?section=ours..., RCATS, Casabyte, Inc. 2004.
SOTAS Solutions: Quality of Service, Quality of Service Management, SOTAS Inc. 2003.
Office Action mailed Jan. 2, 2008 for U.S. Appl. No. 11/175,856.
U.S. Appl. No. 11/175,856, Jun. 27, 2008, Office Action.
1020077003742, Aug. 25, 2008, Notice of Preliminary Rejection (Korea).
U.S. Appl. No. 11/175,856, Nov. 7, 2008, Office Action.
U.S. Appl. No. 11/175,856, filed Jul. 5, 2005, Roskowski, et al.
U.S. Appl. No. 11/175,572, filed Jul. 5, 2005, Roskowski, et al.
U.S. Appl. No. 11/175,572, filed Jan. 7, 2009, Office Action.

* cited by examiner

COLLECTION OF DATA AT TARGET WIRELESS DEVICES USING DATA COLLECTION PROFILES

RELATED APPLICATION

This application claims the benefit of U.S. Provisional Patent Application Ser. No. 60/586,480, filed Jul. 8, 2004, which is incorporated herein by reference.

BACKGROUND OF THE INVENTION

1. Field of the Invention

The present invention relates generally to wireless communications networks and related systems and devices. More particularly, exemplary embodiments of the invention concern systems and methods for using distributed network elements to implement monitoring and data collection concerning selected network parameters.

2. Related Technology

As a result of advances in technology and enormous increases in the number of wireless device users, the size and complexity of wireless communications networks has greatly increased. An inevitable consequence of such increases in size and complexity has been a relative increase in operational and performance problems associated with communications networks. Reliability issues, such as dropped calls, lack of coverage, and poor audio quality are impeding the acceptance of wireless technology by end users. These and other quality issues have prevented many end users from relying upon wireless voice and data services as their primary means of communication. As new services are introduced that use even more complex technology, exercise different usage modalities, and place additional demands on networks already laden with problems, network performance will deteriorate further. Quality of service has a direct impact on customer churn, a tough and costly problem that reduces profitability. Therefore, improving quality of service is a top priority for service providers.

Network monitoring solutions are well known in the art and widely employed by service providers, however, currently available solutions can only monitor and diagnose subsets of the overall telecommunications system and therefore do not provide the holistic view of network and device performance needed to efficiently identify and resolve quality issues. Typical approaches to network monitoring include "self-monitoring" wherein a network element reports on its own status and performance and reports any errors that occur during its operation. The resulting operational metrics from a single element can sometimes be indicative of a broader, system-wide problem, but rather than providing answers, problem resolution entails guesswork and extended troubleshooting, which wastes valuable resources. Another common approach includes placing probes at various points in the network to determine if network elements are functioning according to specification. Sometimes referred to as "sniffers", "log monitors" or "event monitors", these monitoring systems are effective at identifying performance issues with a particular network element, but they fail to capture problems that stem from the interfaces among network elements, i.e., these solutions do not address the case where single elements are performing according to specifications, but problems occur when those elements interact with one another. This far more complex and subtle set of problems has costly consequences to network operators when services cannot be delivered to end customers.

Another monitoring approach known in the art involves pre-programmed service monitors, where specific elements perform service transactions to emulate "real-world" transaction activity; end to end performance is then monitored and the results reported. While these solutions catch systematic failures, they cannot detect intermittent or dispersed problems, subtle impairments, or device or end user specific issues. Further, they can only test anticipated usage scenarios and fail to adapt to new usages and interactions between services.

Significantly, the aforementioned solutions lack the ability to monitor network conditions and intelligently and dynamically define and generate data collection models in response to changing network conditions. Even with the employment of probes in a communications network, it is often the case that the probe provides only an indication of a problem, and actually troubleshooting the problem requires personnel to be dispatched to a physical location on the network, adding significant time and cost to problem identification and resolution. Moreover, these troubleshooting techniques do not provide a multi-faceted view of the different network layers, such as the physical layer, the applications layer, etc., and they do not correlate performance issues across these layers. As a result, numerous quality issues impacting end users go undetected or are misunderstood. Consequently, they may become crises because the performance data provided by currently available network monitoring solutions lacks the detail and timeliness needed to quickly identify, prioritize and resolve network issues.

Furthermore, currently available network monitoring solutions cannot adequately monitor and report on a particular end user's experience with network usage, therefore, service providers must rely upon the end user to report performance problems to a customer service representative. However, it is frequently the case that once reported, an end user's problem cannot be duplicated due to the difficulty of recounting the details of what s/he experienced, the timing of the occurrence, and the lack of underlying data to validate the issue. Additionally, because the service provider is unable to view network performance holistically, it likely does not understand the true scope of the reported problem and it cannot appropriately prioritize the problem for resolution. The problem, therefore, is not resolved to the reporting end user's satisfaction, creating a disincentive for the end user to diligently report problems in the future. Furthermore, an opportunity to prevent the issue from affecting others and to improve the overall quality of the network is missed.

Thus, situations frequently arise where the end user is alienated from the company providing the communications service, without the service provider even being aware of the cause or source of the end user's dissatisfaction. Moreover, because so many end user problems go unreported, it is almost impossible for service providers to obtain reliable information about the scope of a particular issue. Therefore resources are frequently spent solving issues that are well described, but only affect a small number of end users, versus problems that are poorly described but effect a much larger number of end users. As a result, a service provider with an incorrect understanding of the scope of an issue may allocate an inappropriate amount of resources toward resolution, or it may fail to recognize the value of prioritizing resolution.

Still other monitoring solutions known in the art are directed to gathering and analyzing information about the performance of wireless devices. Typically, the monitoring software will be installed on a wireless device at the time of manufacture or by downloading the software onto the device. The software then runs continuously in the background, monitoring device and application performance. When a particular event or error associated with the device occurs, the software collects the data associated with the error or event and may upload it either in real time or at a later time to a data repository for analysis. As discussed below however, such approaches are inflexible and fall well short of an adequate or effective solution.

Just as the aforementioned network monitoring solutions monitor the performance of particular elements in the network, the wireless device monitoring software contributes another set of data points concerning the performance of the wireless device, but the fundamental problem remains that while device performance information is useful, it is disconnected from the other performance data being generated elsewhere in the network, and there is no mechanism for understanding this data in the context of the performance of multiple network elements across network layers.

Furthermore, such approaches tend to emphasize the use of pre-configured data gathering software. While the software can be instructed to collect certain subsets of data, the software cannot be quickly revised or modified to accommodate rapidly emerging and changing conditions. That is, the software can only collect the data that was originally programmed to be collected and further, such data can only be collected in accordance with the conditions initially programmed. Thus, the capabilities of such software are constrained by the foresight of the programmer. Because it is simply not possible for a programmer to be able to anticipate the wide variety of usage conditions, problems and events that may occur in connection with communications network operations, this lack of flexibility is a significant limitation.

This lack of flexibility is also problematic in situations where a transient network condition occurs. In particular, because the software cannot be quickly and easily updated to respond to changing network conditions, the window of opportunity to collect data concerning a transient network condition may close before the software can be modified to target that data, thus denying network administrators and other personnel the opportunity to adequately diagnose and resolve the problem.

Finally, the flexibility of such software is further impaired by the fact that such software is either loaded on the mobile phone at the time of manufacture, or must be downloaded from a web site or service. Thus, revisions or updates to the data gathering software are somewhat cumbersome and time-consuming to obtain. Because different users may load the revised software, if at all, at different times, there is no quick and reliable way to ensure that a statistically significant number of devices are available, with the appropriate software, to gather the data needed for a particular analysis.

BRIEF SUMMARY OF AN EXEMPLARY EMBODIMENT OF THE INVENTION

In view of the foregoing, and other problems in the art, the present invention relates to systems and methods that implement a new way to monitor services in a wireless communications network by utilizing the numerous "end points" or end user devices to capture "real world" usage and performance data across network elements and layers. Because many errors that occur in conjunction with the performance of certain services are only visible from the perspective of the end user's wireless device, the methods of the present invention enable the collection of this data which would otherwise be unavailable. Further, the data collection methods disclosed herein allow interactions within and among multiple network layers and network elements to be identified and accurately associated with one another. In this manner, valuable diagnostic data corresponding to the performance of services within the context of conditions occurring among multiple layers of the network, including the physical layer, the transport layer, and the application layer, can be viewed and analyzed.

While data collection methods are already in use in connection with large numbers of high capacity end points such as networked PCs and with singular, highly specialized systems with considerable constraints such as the Mars lander system, the methods disclosed herein are directed to service monitoring techniques that rely on a vast number of wireless devices with relatively limited functionality (e.g. constrained memory capacity and battery life) and complex dependencies (e.g. interaction with RF networks providing variable capacity and reliability) to monitor and capture network and device performance data in response to changing network conditions. These conditions are often transient, geographically isolated, and/or dependent on specific interactions between network elements. Thus, the data collection and management system of the present invention addresses a very different set of problems than those addressed by data collection systems known in the art.

Exemplary embodiments of the systems and methods of the invention can be implemented by selecting and using distributed wireless devices, wireless telephones and telephony-enabled personal digital assistants (PDAs), to implement monitoring of one or more wireless communications network parameters, collection of data concerning such parameters, and conditional transmission of collected data to a reporting system. In conjunction with the monitoring and data collection activity of wireless devices, it should be noted that in some embodiments, the methods of the invention may be implemented using network nodes other than wireless devices, including wireline devices, application servers or other servers on the network, where data can be collected and then processed as described above.

One embodiment of the invention provides for a service quality platform of the data collection and management system to dynamically generate and download to a population of wireless devices rule-based data collection profiles. Data collection profiles may be generated manually by a network administrator, a software developer or other personnel involved in the operation of the network (hereinafter referred to as "network administrators"), created offline as a portion of a data analysis solution, or automatically generated based on network parameters or other events. Profiles define what information is to be collected on the devices in response to which conditions and events, as well as the conditions and events that cause the device to upload the collected information. Conditions or events include any occurrence in the network or on the device that the device can sense, such as a call dropping or a user pressing a button on the device. Conditions and events also include the passage of time, or a request from a network administrator that the device report information back to the server. In the exemplary embodiment, a population of wireless devices (which may be referred to herein as "wireless device(s)", "wireless communication device(s)", target wireless device(s)", or "the device(s)") that is to receive the data collection profile and execute data collection is selected based on the characteristics, capacity, and availability of an end user's wireless device. As part of the target wireless device qualification and selection process, particular attention is directed to implementing the collection of data in such a way as to avoid overwhelming end user devices. Similarly, when defining the data collection rules in the data collection profile, consideration is given to the impact on device and network resources of the desired data collection activity, and the rules defining profile download, data collection, and upload of collected data are defined in such a way as to avoid adversely impacting network performance. For example, in some cases, uploading collected data may occur only in off-peak times when device and network activity is particularly low. Furthermore, because network monitoring and data collection activity is expensive in terms of the device and network resources utilized, in addition to the rigorous device qualification process, methods of the invention provide the ability to structure a data collection profile to ensure that extraneous data is filtered during the data collection process and that only the most relevant and reliable data is presented for analysis with regard to a particular issue.

The invention may be practiced in conjunction with a wireless communications network such as a wireless cellular telephone network that includes a plurality of wireless devices, such as wireless telephones that are suitably equipped to establish a connection to and communicate with the network. The data collection and management system is comprised of the service quality platform (SQP), which generates and manages data collection activities and processes and stores collected data, and the service quality client (SQC), which resides on the target wireless device or another target network node to enable it to participate in data collection activities.

In operation, the data collection and management system of the invention enables a multitude of wireless devices and network nodes, each equipped with an SQC, to provide information regarding complex network status issues. The following discussion presents an exemplary embodiment of the invention in which queries are used to obtain such information, although the invention is not limited to the following mode of operation. According to this embodiment, a complex network status issue can be described in terms of a "query"; i.e. a question regarding the status or performance of a network device or other aspects of network performance. In response to initiation of such a query, the SQP determines if it already has data stored within one of its subsystems that meets the criteria specified in the query; if so, that data is made available for analysis and the query is answered immediately. If the required data does not already exist in the SQP, a collection task request (CTR) is generated and processed by the tasking sub-system of the SQP. CTRs are typically defined in advance as part of a data collection and analysis package that addresses a particular business or technical need. The CTR is then stored in the SQP, and invoked as the need arises. In some cases, the CTR can be defined on demand by a network administrator. The CTR is then used as a basis for building a data collection profile. The profile describes for each target wireless device that receives it what parameters should be captured, and what events will cause data to be captured, stored, and uploaded. Once a data collection profile has been created, a set of target wireless devices is selected based upon criteria relating to the CTR and to the characteristics of the available wireless devices. Qualifying characteristics may include device type, such as manufacturer and model, available memory and battery life, the type of applications resident on the device, the geographical location of the device, usage statistics, including those that characterize a user's interaction with a device, and the profile of the customer. The data collection profile is then provided to the SQC on the target wireless devices.

As noted previously, in some embodiments data collection profiles are also sent to other network nodes, such as an application server. It should be noted that use of the term "target devices" herein refers to a broader category of devices that includes wireless devices and other network nodes that may be employed by SQP in the collection of data. In accordance with the instructions specified in the profile, the SQC on the target devices and other network nodes collects, stores, packages and uploads the specified data. Finally, the SQP receives the reported data and processes it to provide useful information for decision support. Based on the reported data, additional queries and data collection profiles may be generated and executed to further explore and diagnose a problem. For example, based on a set of rules, additional queries may be automatically generated, target wireless devices may be automatically selected, and the new queries, encompassed in a data collection profile, can be sent to the selected devices. In other situations, the existing data collection profile may persist on a device for any amount of time and direct the SQC to continue to periodically collect, package, and upload data. More generally, the data collection profile may be deactivated, refined, or replaced at any time.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Reference will now be made to the drawings to describe various aspects of exemplary embodiments of the invention. It should be understood that the drawings are diagrammatic and schematic representations of such embodiments and, accordingly, are not limiting of the scope of the present invention, nor are the drawings necessarily drawn to scale.

Embodiments of the invention relate to systems and methods for using distributed wireless devices and other network nodes to implement monitoring and data collection concerning selected communications network parameters. The collected data can then be analyzed and data collection efforts further focused and refined as suggested by the collected data and associated trends. The data analyses may be used in connection with, among other things, detecting network impairments and outages, implementation of corrective actions, streamlining of network operations, improvements to customer service, and development of marketing strategies.

I. Exemplary Wireless Communications Network and Wireless Devices

Figure 1:
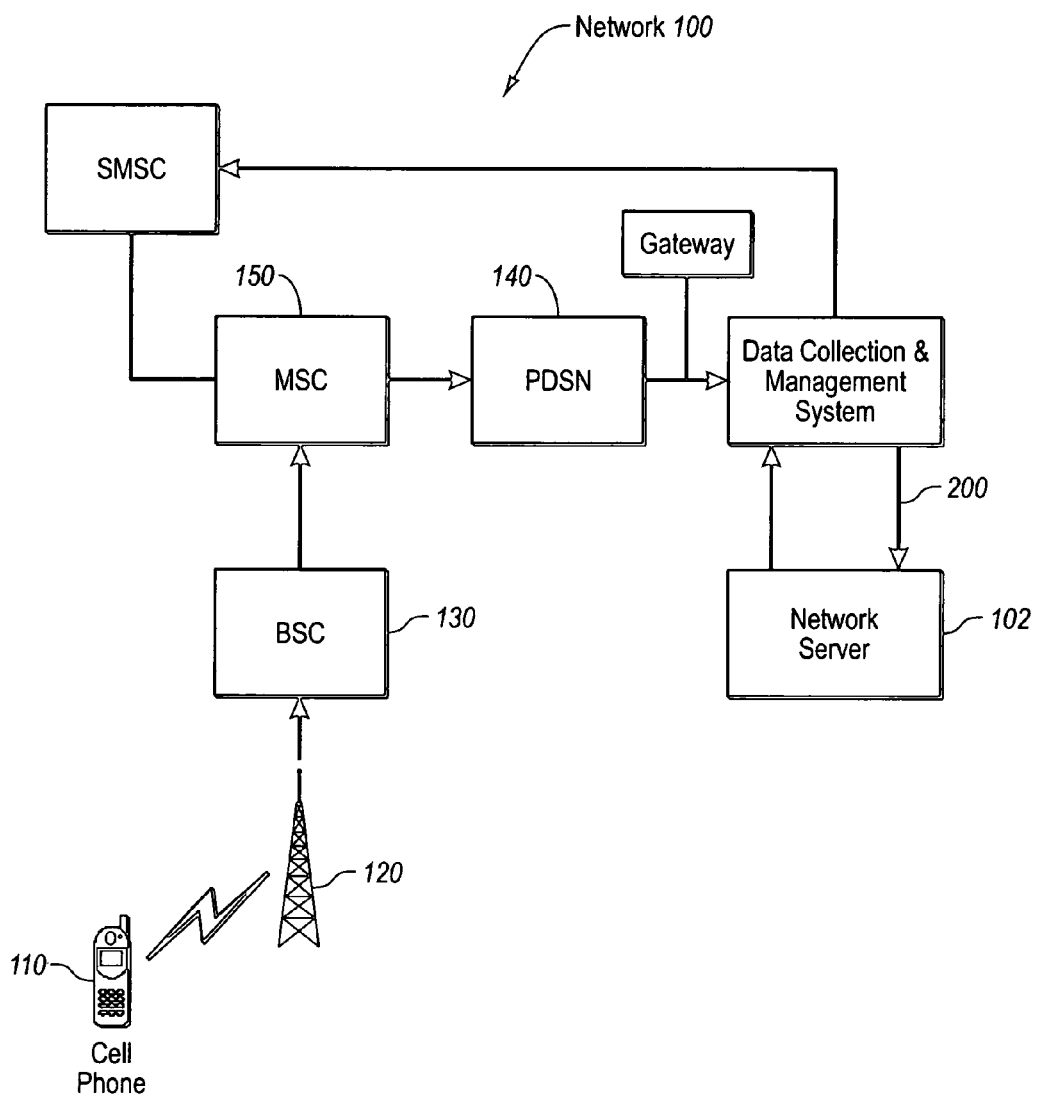
FIG. 1 illustrates an example of a wireless communications network in which the data collection system may be practiced

In order to describe the various methods of the invention, FIG. 1 illustrates an example of a wireless network 100 in which the invention can be practiced. It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

The network of FIG. 1 represents only an example of the suitable environments in which the invention can be implemented, and other network architectures are possible. In particular, wireless network 100 is described and illustrated as a Code Division Multiple Access (CDMA) network, whereas the invention can be practiced with other wireless networks, including Global System for Mobile Communications (GSM), Universal Mobile Telecommunications System (UMTS), Time Division Multiple Access (TDMA), Wideband Code Division Multiple Access (WCDMA), General Packet Radio Service (GPRS) networks, 802.11 networks and other networks, including those that will be developed in the future. More specifically, in the exemplary embodiment of the invention, wireless network 100 includes a radio frequency (RF) network that provides radio connectivity and session management for circuit-switched and packet data technology-based communication. Accordingly, wireless network 100 includes or interfaces with all of the elements necessary to route circuit-switched telephone calls and/or packet data communication through the network, including one or more wireless devices 400, a base station 120, base station controller (BSC) 130, mobile switching center (MSC) 150 and a packet data serving node (PDSN) 140. More specifically, the methods of the invention can be used in conjunction with a circuit-switched network, a packet data network, or both. While the exemplary embodiment of the invention uses Internet Protocol (IP) as its transport protocol, the methods of the invention may be implemented using other transport protocols, such as short message service (SMS) and Short Data Burst services that are well known in the art. Wireless network 100 may also include a Home Location Register (HLR), Visiting Location Register (VLR), billing and provisioning systems, one or more gateways, the servers and infrastructure necessary to use short message service messages, and may include many other network elements not depicted in FIG. 1. Application servers or third party reporting systems (depicted as network server 102 in the exemplary embodiment), may reside outside network 100 and can be used in conjunction with the present invention. References herein to the terms "wireless network" or "the network" throughout should be construed as inclusive of the network infrastructure, servers, end user devices, and applications and services.

Wireless network 100 may further include third party network monitors, probes, and packet sniffers, which are known in the art, for use in conjunction with the present invention. Data collection and management system 200, while depicted for purposes of illustration as functioning in conjunction with the packet data network, may receive data from nodes on a circuit-switched network or elements of the system may be located in a circuit-switched network and receive data from a packet data network. Gateways, network monitors and other network elements may be employed to facilitate transmission of data between the networks and the data collection and management system 200. Furthermore, in one embodiment, elements of data collection and management system 200 may be implemented on one or more network servers residing within the network operator's network. Alternatively, data collection and management system 200 may be implemented as a service hosted by a service provider other than the network operator, and elements of the system may therefore reside outside the network operator's network and be equipped to communicate with the various nodes in the network operator's network.

II. Structure of Exemplary Data Collection and Management System

Figure 2:
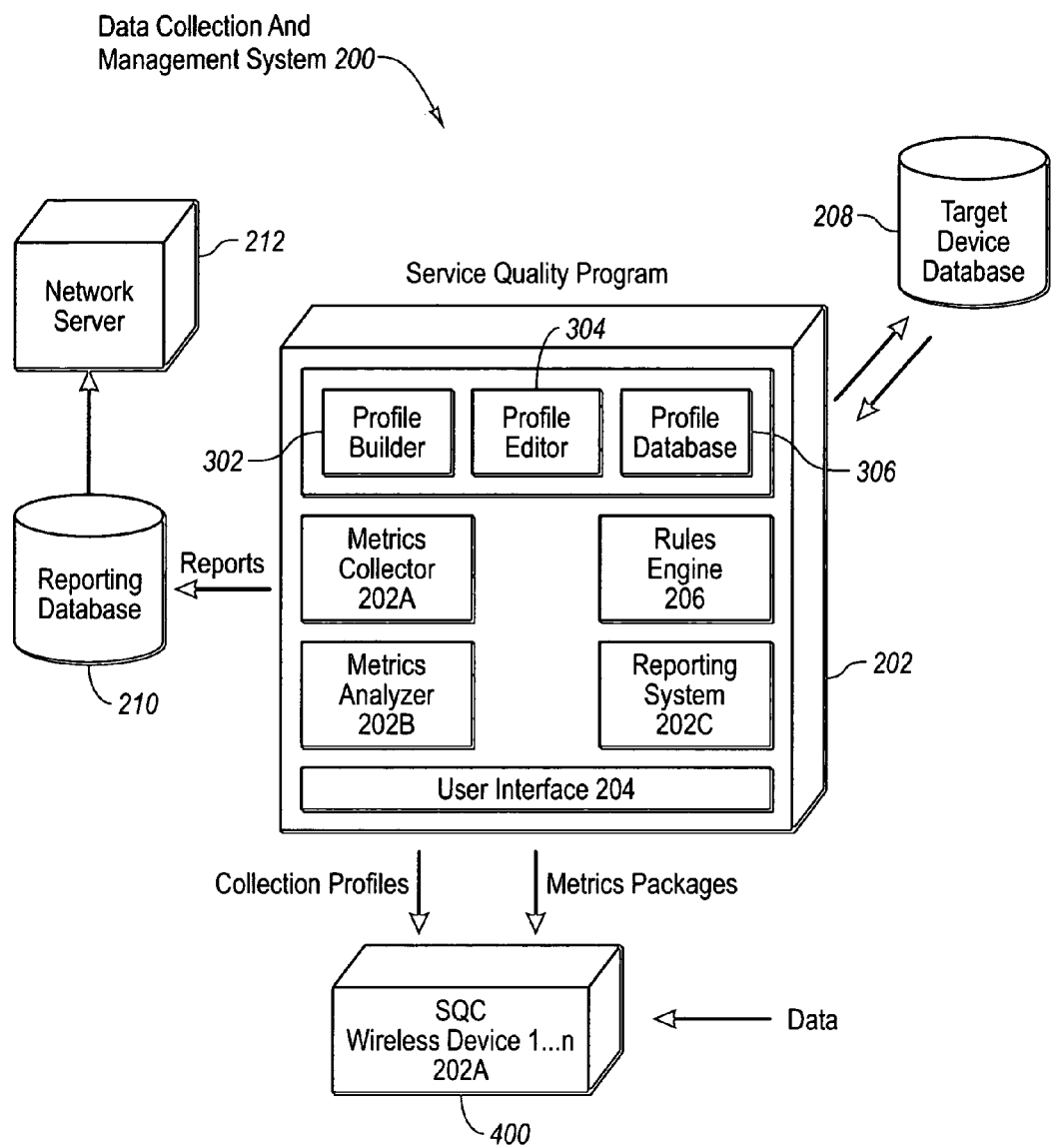
FIG. 2 is a schematic view illustrating aspects of a data collection and management system suitable for use in connection with communications network operations.

FIG. 2 illustrates details concerning an implementation of a data collection and management system, denoted generally at 200, as well as some of the related components of wireless network 100 with which it can be used. The functionality disclosed herein may be employed in connection with a wide variety of network devices, either wireless or wireline, including radios, personal digital assistants ("PDA"), network servers, desktop computers and other devices associated with network communication.

In the exemplary embodiment, the data collection and management system 200 of FIG. 2 makes use of one or more target wireless devices 400 that enable an end user to gain access to telephony services and is equipped to provide access to Internet or multimedia data through any suitable protocol that allows target wireless device 400 to participate in a packet data network. Target wireless device 400 can be substantially any mobile wireless device that can communicate in the environment of wireless network 100, and can be a wireless telephone handset, a wireless personal digital assistant (PDA), or another wireless communication device. The wireless devices can also be referred to as mobile stations, or mobile devices, and hereinafter will be referred to as wireless devices.

Target wireless device 400 has a local memory that is used to locally store data that is transmitted over wireless network 100 and permits the execution of software such as an operating system and applications, and to otherwise support the operation of the wireless station. A variety of operating systems known in the art such as Symbian, REX, or any other suitable operating system may reside on the wireless device. In addition, target wireless device 400 is enabled with service quality client software (SQC) 402 that allows it to participate in data collection activities by receiving and executing data collection profiles and otherwise communicating with service quality platform (SQP) 201 of data collection and management system 200. SQC 402 may be installed on the wireless device by a variety of methods, including installation at the time of manufacture, various download methods such as placing the device in a cradle which is connected via a cable to a computer, or using any number of over-the-air methods.

Development environments such as BREW and JAVA may also reside on the wireless device and support such downloads of SQC software 402 or otherwise support operation of the data collection system. Further, a typical target wireless device 400 includes a variety of application software that enables the wireless device to access one or more services offered by the network service provider or which provide utility or entertainment for the user such as calculators and games. Typical target wireless devices 400 also include a radio transmitter and receiver, circuits for voice encoding and decoding and for call control, a display device, a keyboard, a power supply and may include a Subscriber Identity Module (SIM) chip. It should be noted that in other embodiments, SQC software 402 may also be installed on other nodes in the network in order to receive and execute data collection profiles as previously noted. For example, in addition to the data collection activities of the wireless devices, the SQC software may be installed on an application server within the network or on the PDSN so these network nodes may participate in the data collection activity.

With continuing reference to FIG. 2, data collection and management system 200 includes SQP 201 and SQC 402. Elements of SQP 201 include metrics collection sub-system (MCS) 202, composed of metrics collector 202A and metrics analyzer 202B; tasking sub-system 204 composed of tasking processor 204A, tasking database 204B and target device database 204C; the profile sub-system 206 composed of profile builder 206A, profile editor 206B and profile database 206C; reporting sub-system 208 composed of reporting engine 208A, rules engine 208B and reporting database 210; and interface sub-system 212 composed of the user interface (UI) 212A and API/services interface 212B. Data collection and management system 200 further encompasses one or more target wireless devices 400 or other network nodes on which resides SQC 402. Additionally, data collection and management system 200 may communicate with one or more network servers 102, such as a third party reporting system.

As noted earlier, the data collection and management system 200 of FIG. 2 may be implemented as a service hosted by a service provider other than the network operator or, in other implementations some or all of the functionality of the data collection and management system 200 may be provided in the form of a stand- alone software package suitable for installation on a network server and/or other network systems within the network operator's wireless network 100. Accordingly, the scope of the invention should not be construed to be limited to any particular form of implementation of the data collection and management system 200.

The SQP 201 of data collection and management system 200 generally serves to create and manage various queries, CTRs and to generate data collection profiles as may be employed in the collection of data. Further, SQP 201 receives collected data and performs various analyses and other processes concerning the collected data.

With continuing reference to SQP 201 of FIG. 2, metrics collector 202A of MCS 202 receives collected data from a plurality of wireless devices 400 or other network entities. The collected data may be provided to metrics collector 202A either directly or via other network nodes such as PDSN 140 or gateway 160. The MCS 202 may communicate with tasking sub-system 204 and reporting sub-system 208. The metrics analyzer 202B may perform validation, augmentation and/or analysis functions such as incident matching of the received data prior to passing it on to the other sub-systems of SQP 201. The MCS 202 may also receive and respond to requests for collection profiles from SQC 402 enabled devices. For example, upon initial activation of a device enabled with SQC 402, the SQC indicates its presence to SQP 201 via MCS 202, in response to which one or more profiles may be downloaded to the device.

Reporting sub-system 208 stores reports generated as a result of inputs from MCS 202, and data from external systems such as third party network monitors, in reporting database 208C. The reporting database 208C may also export or publish report data to another reporting or presentation system, depicted in the exemplary embodiment as network server 102. Reporting database 208C may be integrated with data collection and management system 200 or another network element, or it may function as a standalone database. The reporting sub-system 208 further performs a central role in the collection tasking process as described below.

In one embodiment of the invention, the information regarding complex network status issues can be obtained using the following procedures, although the invention is not limited to the following mode of operation. According to this embodiment, when processing a new query, reporting sub-system 208 first checks if reporting database 208C already has data that is sufficient and necessary to answer the query. If it does, and no additional collection is required to satisfy the query, the data and/or reports are returned to the network administrator. If the reporting database 208C does not contain data to answer the query, a CTR is generated and tracked throughout its lifecycle by reporting sub-system 208 and processed by the tasking sub-system 204. Tasking sub-system 204 communicates with profile sub-system 206 to select an existing data collection profile or generate a new data collection profile as needed, identify the appropriate set of target wireless devices, send the data collection profile to the selected target wireless devices, and communicate with the reporting sub-system to keep track of the collection task and original query. If the query requires collection from a non-SQP device, i.e. a device that has not been enabled with an SQC to allow it to participate in data collection and management system 200, the reporting sub-system 208 will generate and send a CTR for the external system through the interface sub-system 212. This way, a required task, while not directed by data collection and management system 200, can be documented, tracked, and viewed within the system and within the context of other data collection activities being conducted by the system. It should be noted that tasking sub-system 204 and/or reporting sub-system 208 may also consider the priority of the query and/or CTR when generating data collection profiles and identifying the target device population. It is also noted that any of the foregoing tasking functions can be replaced by an operator and, according to another embodiment of the invention, the operator directly assigns profiles to devices.

SQP 201 may communicate with one or more network servers 102 to provide data collection and management services. For example, reporting subsystem 208 of SQP 201 can provide reports, raw data and other data products to network servers 102. Network administrators and external systems can then access the data by way of network server 102. Elements of data collection and management system 200 may also communicate with various messaging services in wireless network 100 such as a short message service center (SMSC) 180 to initiate communication with one or more target wireless devices 400 or to notify network administrators that requested data has been collected and is available for analysis.

SQP 201 further includes a profile sub-system 206 which cooperates with tasking subsystem 204, rules engine 208B and target device database 204C to generate or modify various data collection profiles that govern the collection of data concerning various network operations and parameters. To this end, profile sub-system 206 includes profile builder 206A, profile editor 206B, and profile database 206C. Note that profile sub-system 206 may be configured and implemented in various ways. In one implementation, profile sub-system 206 comprises an element of SQP 201. In another implementation, profile sub-system 206 is a stand alone system configured to communicate with data collection and management system 200. Accordingly, the scope of the invention should not be construed to the implementation of the profile sub-system 206 indicated in FIG. 2.

The data collection profiles generated in connection with profile sub-system 206 can then be downloaded to a designated set of target wireless devices 400. Tools can also be used at this point to identify target devices that are compatible with the profile and suitable for the query. SQC 402 that is resident on target wireless device 400 receives data collection profiles and executes data capture processes in response to "triggers" defined in the profile, which initiate and terminate data collection activities, as well as in response to other rules and instructions in the data collection profiles. Data collection rules, triggers, and other instructions contained in data collection profiles are sometimes referred to herein collectively as "data collection directives" as a matter of convenience. As suggested earlier, the target wireless device 400 can be a mobile phone or other wireless device. However, as mentioned previously, a target device may be any other network element or node that is equipped with SQC software, allowing it to collect and upload data to SQP 201.

Data collected by target wireless devices 400 may be buffered in SQC 402 awaiting creation of a metrics package. Once created, a metrics package may be archived in the metrics archive of SQC 402, deleted, or uploaded to metrics collector 202A of MCS 202.

UI 212A of interface subsystem 212 can be a graphical user interface that enables one or more network administrators, to interact with and control the operation of data collection and management system 200. In this regard, it should be noted that in at least some implementations of data collection and management system 200, UI 212A facilitates generation and manipulation of queries, discussed below, by a network administrator concerning collection of data relating to one or more aspects of the wireless network 100. In some cases, such queries may be automatically created or refined based on reports generated and output by reporting sub-system 208 or as the result of processing by rules engine 208B. Additionally, UI 212A may be used by network administrators to retrieve data and reports from the system and the API/services interface 212B may be used by external systems to submit commands and requests to the system and to retrieve reports and data generated from the data collection and management system 200.

Finally, the target device database 204C includes a variety of types of information pertaining to target wireless devices, such as mobile telephones, and other network nodes that comprise elements of the wireless network 100. Target device database 204C may be implemented in many different manners. It may be an existing network element in the service provider's network such as a Home Location Register (HLR), in which information about the characteristics and behavior of wireless devices is stored and accessed by elements of the data collection and management system 200. Alternatively, target device database 204C may reside within the data collection and management system 200 wherein it collects device usage information and device characteristics upon the device registering with wireless network 100. In some cases, a data collection profile specifically directed to gathering information to populate the target device database can reside on the wireless device, gather status and usage information about the device such as applications used, base stations encountered, etc . . . and then report this information to the target device database 204C. By providing such data and periodic updates to target device database 204C, SQP 201 can finely tune its device selection criteria for more effective device targeting. In many cases, the target device database will make use of data from multiple sources, including HLR data, data generated by profiles, and data from other databases associated with user accounts, device properties, or network characteristics amongst others. As a result, data collection profiles are downloaded to those target wireless devices 400 that are best suited for collection of the data that is responsive to the defined query or queries. It should be noted that the interfaces to the aforementioned multiple sources are well known in the art, and therefore not described herein.

Accordingly, the target device database 204C can include information such as the model number and manufacturer of the target wireless device, the account type or types associated with the target wireless device, information concerning specific hardware features of the target wireless device such as the battery type and memory size, the billing address associated with the target wireless device, usage information, applications installed, geographical areas frequented, and any other information that facilitates selection of one or more target wireless devices 400 in connection with a particular query concerning the communications network. The database can be created from information collected from the devices themselves via the data collection and management system or by any other suitable means. In addition, it is noted that the foregoing are exemplary only and, more generally, virtually any other target wireless device characteristics that are desired to be employed or considered to be relevant may be included in the target device database 204C.

Additionally, because data collection and management system 200 allows multiple data collection profiles and data analysis activities to be performed simultaneously, a particular device may be targeted to execute multiple data collection profiles. Therefore, target device database 204C tracks the data collection activity occurring on the devices and maintains detailed information about the specific data collection profiles that are active on the devices. In doing so it can detect and resolve any contention or prioritization issues by adjusting the population of target devices selected.

Target device database 204C may also store information about non-SQP entities in the network, including characteristics such as location of the non-SQP device in the wireless network 100, geographical areas serviced, data available etc . . . In general, virtually any other characteristic or attribute of the non-SQP entity that could be considered relevant may be stored.

Finally, it should be noted that FIG. 2 illustrates one manner in which various functionalities associated with the data collection management system 200 may be allocated. Accordingly, the functionalities disclosed herein in connection with the data collection and management system 200 may be allocated in a variety of other ways as well depending upon considerations including, but not limited to, the various types of distributed systems and devices employed, the data desired to be collected, and the structure of the communications network or other system. Thus, the functionality allocation illustrated in FIG. 2 is exemplary only and should not be construed to limit the scope of the invention in any way.

III. Exemplary Queries

Figure 3:
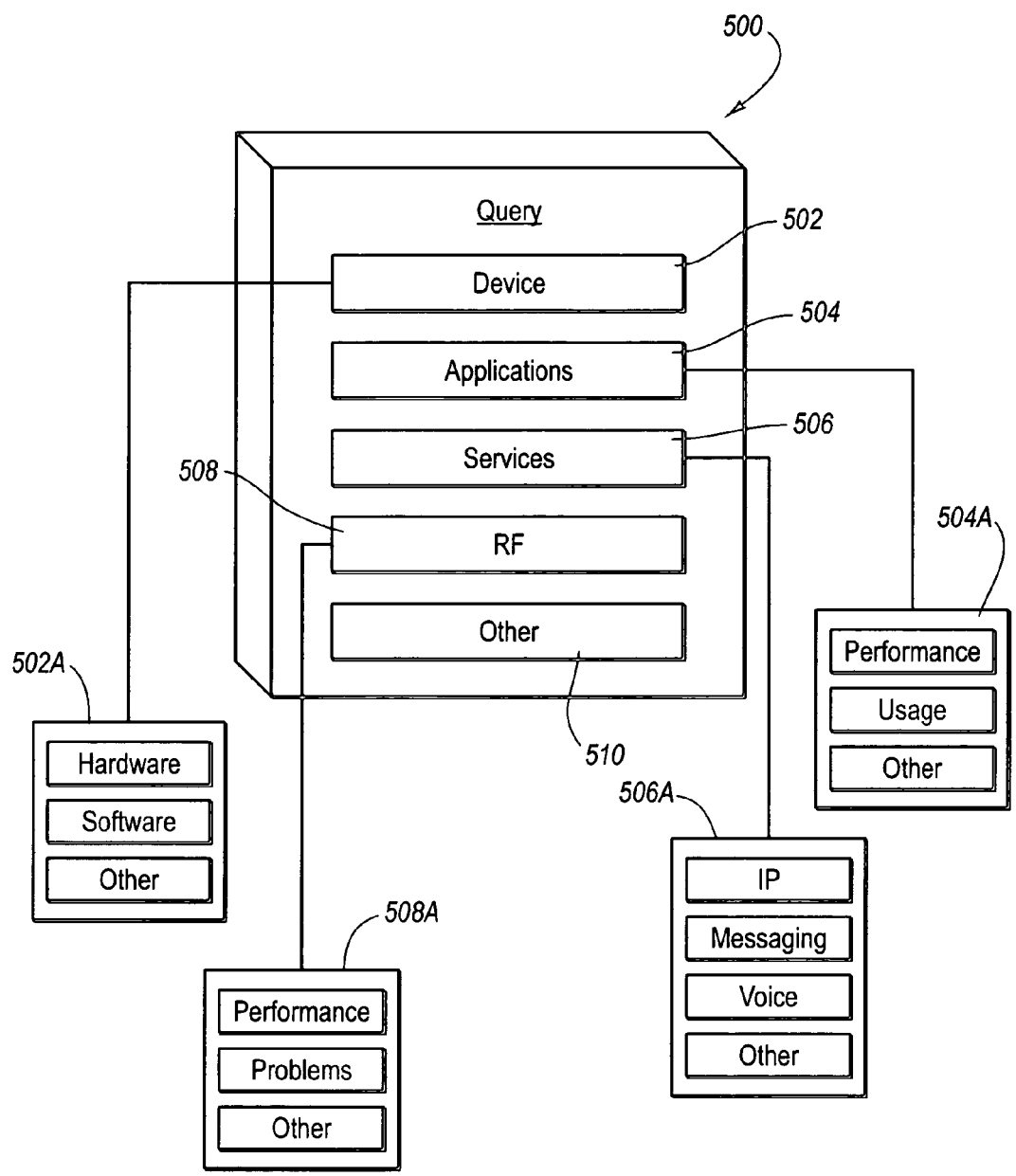
FIG. 3 is a schematic view depicting various considerations that relate to a query that can be executed by the data collection and management system.

Directing attention now to FIG. 3, details are provided concerning methods and systems for defining and posing queries in connection with the data collection and management system 200. Such queries may be defined with reference to any of a variety of different perspectives concerning the operation or functionality of the wireless network 100 and associated target wireless devices 400 or other network nodes. The queries may be structured in such a way that performance information is gathered about the effect of a simple activity, such as a button press by the user, or information may be gathered about more complex transactions that involve multiple network layers, such as the physical layer, network layer, transport layer and application layer. In particular, the target wireless devices have software stacks that communicate with various network layers of the communications network.

Once collected, the information associated with the software stacks of the devices can then be correlated, such that information regarding the software stacks or the network layers that they communicate with may be packaged together with and viewed within the context of the commensurate RF status information, affording a complete view of the interdependencies among different layers and more accurate analysis of the information. These are exemplary query subjects only, however, and such queries may, more generally, be directed to virtually any aspect of the wireless network 100, associated target wireless devices 400, and any other network node that may be of interest to a network administrator or other personnel.

An exemplary query structure is denoted generally at 500 in FIG. 3. The query structure 500 may be configured in any fashion consistent with functionality disclosed herein. As shown in FIG. 3, one way the query structure 500 can be defined is through interaction between a network administrator and SQP 201 by way of the interface sub-system 212. If defined by a network administrator, the query structure 500 appears as a pop-up window or other type of device that allows the network administrator to make various selections concerning the nature and scope of the desired query or queries. While a network administrator has the ability to intervene with the system and write a query on demand, the preferred embodiment of the invention provides for numerous queries to be "pre-defined" in reporting sub-system 208 and accompanying profiles stored in profile database 206C. As business and technical needs for data collection arise, these pre-defined queries are called upon to generate a complete analysis package, including one or more data collection profiles and associated reports.

Any number and type of query structures 500 can be constructed to enable a network administrator to pre-define or create and submit queries regarding virtually any aspect of the performance and operation of the wireless network 100, one or more associated target wireless devices 400, or any of the services or entities provided in association with wireless network 100. Thus, the query structure 500 indicated in FIG. 3 is exemplary only and is not intended to limit the scope of the invention in any way.

In yet other implementations, one or more query structures 500 are defined that do not include any predetermined menu choices. Rather, a network administrator defines a highly customized query structure by simply dragging and dropping desired items into a basic query structure template. The profile system 206 can be configured to prevent definition of queries, and associated data collection profiles, that are internally contradictory or inconsistent. In this way, the network administrator receives some measure of assurance that no "noise" data will be collected in connection with a given query or data collection profile.

Further, queries, as well as the data collection profiles disclosed elsewhere herein, may be generated either manually or automatically in response to the occurrence of one or more system events or as the result of analysis of previously collected data. Data collection profiles contain "triggers" which direct the initiation and termination of the data collection activity. Aspects of the definition and use of triggers are disclosed in greater detail below.

FIG. 3 conceptually illustrates various aspects of queries. In particular, query structure 500 indicates that the network administrator can define a query that relates to target devices (502), software applications (504), services associated with the target device (506), information concerning the radio frequency system (508) employed by the target device, and any of a variety of other considerations or parameters (510) that may be of interest to a network administrator or other personnel, including various aspects of the data collection and management system itself. Significantly, these queries, in any combination, may be directed to one or more of the aforementioned aspects of activity occurring on the device or within the network to allow capture of the data being generated in association with the activity.

When developing a query related to aspects (502) of a target device, the developer can more specifically target the query to characteristics 502A such as hardware, software, and other aspects of a device such as target wireless device 400. Similarly, a query that relates to applications (504) operating on the target device, can be specifically targeted to characteristics 504A such as the performance of applications present on a target device, the amount of usage of each such application, and various other aspects of applications resident on the target device or otherwise associated with the wireless network 100.

With continuing reference to FIG. 3, a query that relates to services (506) available to a target device can be defined for specific services 506A, including IP, messaging, voice transmissions and various other services associated with wireless network 100. In similar fashion, a query can be directed to RF related aspects (508) of wireless network 100 and/or target wireless devices 400, such as RF performance parameters, problems, and other considerations.

Embodiments of the data collection and management system 200 enable one or more network administrators or other personnel to define and implement a query, or queries, directed to virtually any aspect of the wireless network 100 and/or associated target wireless devices 400 in which the administrator(s) may be interested. As a result of such functionality, a network administrator is not limited to a prescribed choice of query subjects but may more generally define one or more queries directed to any subject matter that may be of interest. Moreover, query structures 500 and their related systems enable specific types of queries that correspond to a particular set of interests to be generated and used.

For example, some query structures 500 are concerned only with information that would be of interest to the marketing department such as the prevalence of applications used. As another example, an accounting department, either alone or in connection with a marketing department, may desire to utilize a query correlating the various service plans with particular groups of end users and the behavior of those end users. As another example, technical personnel associated with the wireless network 100 and associated target wireless devices 400 may desire to invoke queries concerning various performance aspects of the network and the target devices. Technical personnel may further be interested in the performance of other network nodes such as a media server or a packet data serving node. Accordingly, such personnel would have access to numerous pre-defined queries as well as the query structures that would enable them to quickly and easily define multiple useful queries that could be used to identify problems and improve service.

The foregoing query sets may all flow from a single query structure 500 or, as discussed above, may each constitute a distinct query structure accessible only to particular personnel. These are exemplary implementations only however, and the scope of the invention should not be construed to be limited to these examples.

IV. Exemplary Data Collection Profiles

As noted above, a wide variety of pre-defined queries concerning numerous aspects of wireless network 100, the associated target wireless devices 400 and other components that make up wireless network 100 can be used by the data collection and management system to monitor and collect performance data. As noted above, on occasion a network administrator may also create a custom query on demand. Once the query or queries have thus been defined, and it is determined that existing data is not sufficient to satisfy the query, a CTR will cause one or more data collection profiles to be generated or selected to direct the target wireless devices 400 or other network nodes in the collection of data responsive to the query or queries.

In the exemplary embodiment, the data collection effort is pushed out to the population of target wireless devices 400 for the data collection activity. The data collection overhead imposed on each of the target wireless devices 400 is minimal since the demand on each device, including any pre-existing tasking requests has already been considered as part of the device selection criteria. Moreover, as disclosed herein, the collective capabilities and efforts of the various target wireless devices 400 provide a powerful mechanism for readily and effectively collecting data responsive to queries.

Figure 4:
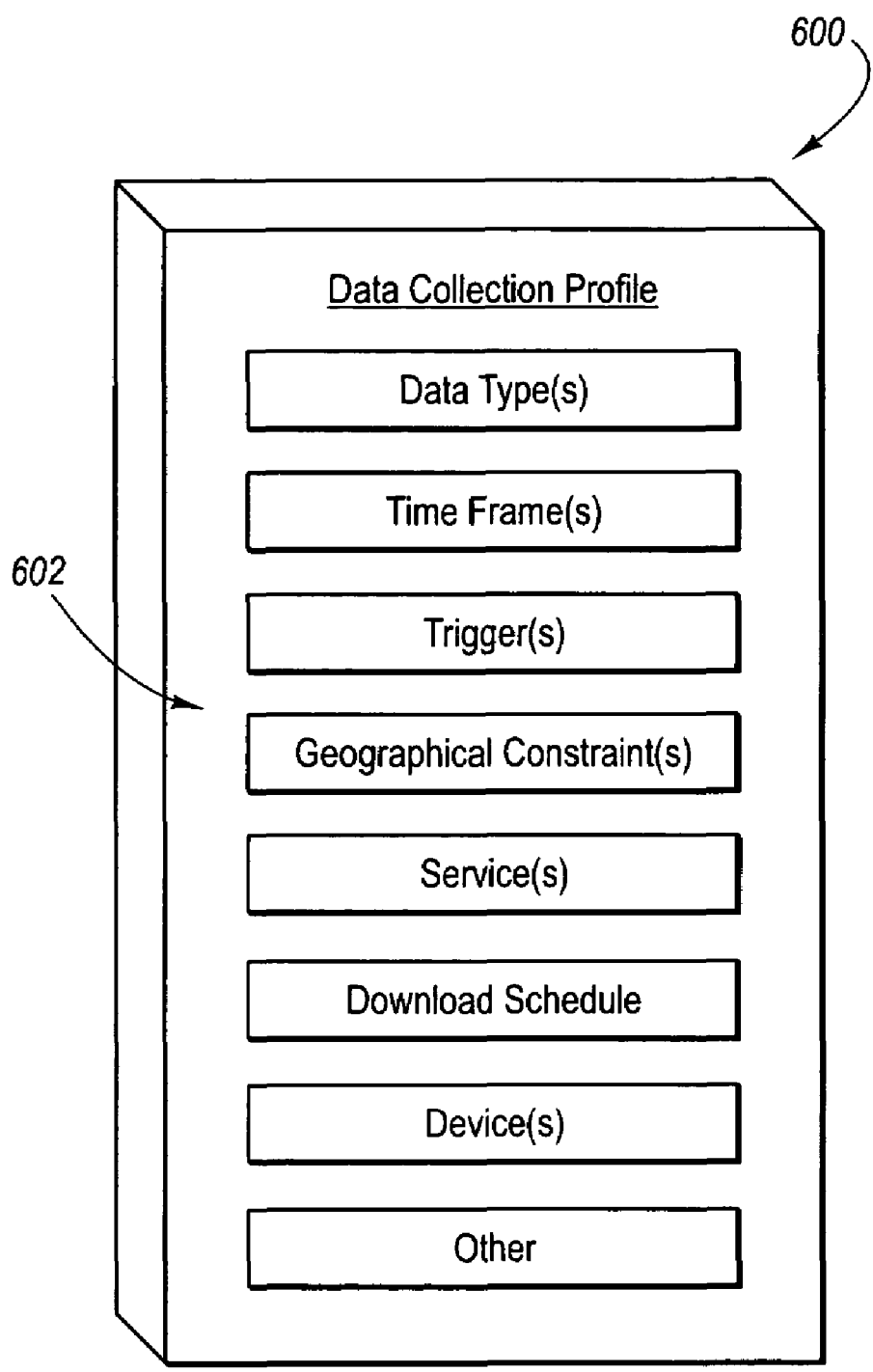
FIG. 4 is a schematic view of a data collection profile that may be employed by embodiments of the data collection and management system.

With the foregoing in view, attention is directed now to FIG. 4 where aspects of a data collection profile 600 are illustrated. As generally indicated in FIG. 4, the data collection profile 600 includes a variety of parameters 602 that define not only a set of data that is to be collected, but also the conditions under which data collection will take place and the manner in which that data is to be collected and processed. In this regard, the data collection profile 600 constitutes a refinement of the associated query in that the data collection profile 600 is directed to specific types and quantities of data that, when gathered and processed, are responsive to the query defined by way of the query structure 500.

The data collection profile 600 can be configured to become active (i.e. commence collection processes) and/or become inactive at a certain time or after a particular period. The data collection profile 600 and/or its constituent collection directives may also expire after a certain period of time. Upon expiration of the data collection profile or its constituent data collection directives, the device may revert to its default profile or it may notify SQP 201 via MCS 202 of the expiration, whereupon it is instructed to receive another profile. In either case, the expiration capability enables the device to effectively "purge" obsolete profiles or individual collection directives and be ready to receive new profiles or collection directives. The data collection profile may also be configured to include multiple triggers which initiate and terminate data sampling over some period of time and in response to certain occurrences. In one case, data collection may occur in response to a trigger that is defined as the occurrence of an event. In other cases, data collection may be initiated or terminated in response to a trigger that is defined as the lack of an event occurrence. For example, a data collection profile may specify that data collection begins upon arrival in a certain geographical area and abort if the user fails to receive a voice call within one hour of entering the specified geographical area. In this case, entry into the specified geographical area is the initiating trigger that causes data collection to commence, data is buffered, and when the voice call fails to occur within one hour, the abort trigger causes data collection to cease. In this case, the buffered data is not transformed into a metrics package, and it may or may not be deleted.

In some cases, data collection may end and then recommence should a specified network event occur. Should this second event fail to occur, that is, the trigger is not activated within a subsequent period of time, the data collection profile may expire. The data collection profile may also contain instructions for the conditions under which collected data is transformed into a metrics package, and whether and when the metrics package is uploaded to the metrics collector 202A. In other cases, the data collection profile 600 may instruct that information about both the occurrence and non-occurrence, as applicable, of specified events, as well as whether data has been collected or not during some period of time be reported to the metrics collector 202A.

In the exemplary embodiment, the profile builder 206A of the profile system 206 operates in connection with a target device database 204C to facilitate definition of a data collection profile 600, and to define the set of target devices to which the data collection profile 600 will be transmitted. As indicated in FIG. 2, the profile sub-system 206 includes a profile editor 206B that enables a network administrator to retrieve and edit one or more existing data collection profiles in the event that circumstances require a manual change to those data collection profiles. Moreover, once completed, the data collection profile 600 may be stored in a profile database 206C for reuse, backup purposes and/or for further editing, copying, or other processes.

In any case, the data collection profile 600 illustrated in FIG. 4 specifies, among other things, the type or types of data that are to be collected in connection with the data collection profile 600. As suggested earlier, the data collected in connection with the data collection profile 600 may comprise virtually any type of data concerning wireless network 100 and/or target wireless devices 400. Thus, the data desired to be collected may relate to the UI of the target wireless device 400, the application or applications resident on the target wireless device 400, the network services accessed by target wireless device 400, the performance of other network elements such as application and network servers, and considerations concerning the various network layers, such as the transport layer and physical layer.

In addition to specifying various data types, the illustrated data collection profile 600 can also specify a time parameter, namely, the time frame, or time frames, during which some or all of the specified data is to be collected. For example, as a result of reports of dropped calls in a particular area, a data collection profile is generated that is directed to dropped call analysis. In this case, the data collection profile may specify that data collection is to begin as soon as the wireless device enters a certain geographical area. The collected data enters a buffer on the device so that it can be included as part of a metrics package if a trigger occurs that causes a metrics package to be created. The data collection profile may further specify as part of the data collection rules, that a five second buffer of information preceding every call occurring while the device is in the specified geographical area is to be saved, and that data be collected for the duration of the call. In the event that the call is dropped, an additional five seconds is captured after the call drops and the data captured before, during and after the call is contained in a metrics package.

In some cases, the data collection profile may specify that certain data be collected on some type of predefined schedule. In other cases, the data collection profile 600 may specify that some data be collected on a regular or periodic basis, while other data is collected only once, or on some other non-periodic, irregular basis. In still other cases, the data collection profile may have predefined start and/or stop dates that specify that, notwithstanding any other conditions, data collection must commence on one particular date and/or terminate on another particular date.

With continuing attention to FIG. 4, the data collection profile 600 includes, refers to, or implicates various triggers which are used to determine if and when a data collection process specified in the data collection profile should initiate, abort, and terminate. For example, one technique known in the art for initiating a network-based instant connect communication (also known as Push to Talk®) is for an originating wireless device to send a Session Initiation Protocol (SIP) INVITE to a network-based instant connect server to request the participation of one or more terminating wireless devices in the communication session. The INVITE is received by the instant connect server and sent on to the terminating wireless device. If the terminating wireless device has been active recently, the server may send a "100 trying" message to the originating device while it goes on to attempt contacting the terminating device.

Typically, when the 100 TRYING message is received at the originating device along with an indication that the floor is open, the originating device begins to send voice data. While the originating device is busy sending voice data, the instant connect server may have tried and failed to actually reach the terminating device, and a 408 TIMEOUT message is sent to the originating device. At this point, the user of the originating device has had a very poor user experience. At the same time, the service provider has no ability to capture all of the transactions that happened or failed to happen between the originating wireless device, the instant connect server, other participating network elements such as the Packet Data Serving Node (PDSN), and the terminating handset. Thus, it has no data with which it can troubleshoot and solve the problem.

Using the methods disclosed herein, one embodiment provides for a data collection profile resident on the originating device to begin collecting data when an initiating trigger is activated—in this example, origination of the instant connect communication attempt. Receipt of the aforementioned 408 error message by the originating device is a terminating trigger condition that causes the SQC 402 resident on the originating wireless device to stop data collection and prepare a metrics package for upload to metrics collector 202A. In some cases, a trigger may cause the data collection activity to abort without creating a metrics package. In the exemplary embodiment, the data collection profile has been further configured to specify that receipt of a 408 error constitutes a condition under which a metrics package is to be immediately prepared and uploaded to metrics collector 202A, and the metrics package is uploaded accordingly. In this example, the terminating wireless device is unaware that a communication attempt has been made, so no trigger has been activated on the terminating device to initiate data collection and/or to cause creation of a metrics package. To ensure that important data related to the communication attempt is collected from the terminating device, receipt by metrics collector 202A of the metrics package from the originating wireless device may result in a command, such as an SMS message, being sent to the terminating device. This command activates a trigger which causes an "on-demand" data collection activity on the terminating wireless device, forces any additional data collection needed, and uploads the metrics package at a specified point in time. It should be noted that the "on-demand" collection activity may occur in addition to unrelated data collection activity that may already be occurring on the device as part of its normal operation. In another case, the terminating device could have a profile that directs it to continually collect data specifically associated with an issue that is being investigated; in this case it would be the timing and frequency of INVITE reception. As a result of the on-demand upload, the history associated with this specific area of concern is uploaded to provide complete visibility of the events occurring on the terminating device and the data surrounding the 408 issue being investigated. Additionally, in some situations, collected data can be subjected to processing at the device, such as minimum/maximum/average/count type processing or other calculations that aggregate or otherwise reduce the amount of data that is to be transmitted from the device to the SQP. In this case, the data that is sent to the metrics collector has already undergone some processing and is not merely raw collected data.

In another embodiment, an SQC may reside on another network element, such as the instant connect application server, and a data collection profile may be configured to immediately prepare and upload a metrics package upon the occurrence of a 408 error. In this case, upon recognition of a 408 error by the instant connect application server, the SQC causes a metrics package to be created and uploaded to metrics collector 202A. SQP 201 then causes the SMS message to be sent to the terminating device, whereupon an "on-demand" data collection activity on the terminating device begins and proceeds as noted previously. More particular information concerning triggers as they relate to the data collection profile and various other aspects of the data collection and management system 200 is provided elsewhere herein.

At the same time as the metrics packages are being prepared on target wireless devices 400, SQP 201 may queue an analysis task in reporting sub-system 208 which is prepared to analyze the metrics packages received from the originating and terminating wireless devices, and from any other network elements equipped with data collection profiles that are associated with the instant connect communication attempt. The metrics package generated at the terminating wireless device is assigned an identifier that associates it with the metrics packages generated at the originating wireless device and/or those generated at the instant connect application server and any other network elements associated with the transaction. At any time, queries may be run against reporting sub-system 208 to identify metrics packages that are associated with other metrics packages so the complete sequence of events that occurred among all of the network elements involved in transactions among the devices can be viewed, tracked and analyzed. Reports generated from reporting sub-system 208 may be stored for later use in reporting database 208C or the underlying data may be exported to a third party reporting system via the interface sub-system 212. Additionally, in some embodiments, notifications concerning receipt of the data or results of the analysis can be sent to other systems as well as to network administrators and other personnel.

As another example of a parameter that is used to guide data collection efforts, the data collection profile 600 can specify certain geographical constraints and limitations. More particularly, such geographical constraints may specify that data is to be collected only by target devices that place or receive calls within specified geographical boundaries or by those within a certain proximity to a particular base station. The data collection profile may further specify that only those devices experiencing a particular problem in a certain geographic area should collect data. Such information may, for example, enable network administrators and other personnel to isolate a recurring problem in a particular area, pinpoint its origin, and make clear the steps for rectifying the problem. For example, such geographical information may also be used to help identify malfunctioning base stations or other equipment in the event that there is an inordinate number of dropped calls within the defined geographical limits. The information may further help identify where equipment, such as signal enhancement equipment, should be placed in the network to improve service. Additionally, geographical information enables development of graphical depictions, such as maps, that indicate the locations and concentrations of various conditions and/or problems with wireless network 100.

As further illustrated in FIG. 4, the data collection profile 600 specifies particular services concerning which data is to be collected. Some implementations of the data collection profile 600 may specify that transmission signal ("Tx") strength data be collected for Internet Protocol (IP) data calls initiated by an instant connect communication session. In other cases, the data collection profile 600 may specify that data is to be collected concerning messaging services accessed by the target wireless device 400. Because the wireless device participates in each service delivered to the end user and utilizes a software stack that communicates with each network layer necessary to deliver the service, the ability to collect metrics in relation to a specific service, and ignore those metrics when not utilizing the service, provides a significant benefit over existing solutions. For example, to monitor the transmit signal strength under the conditions described above, a network probe known in the art would have to monitor all transmit power, for all wireless terminals, across all transports (voice or IP for example), for all services (telephony, messaging, browsing and instant connect communication for example). The scale and scope of this data collection process effectively makes this data uncollectible by any methods other than those disclosed herein in conjunction with the present invention.

In some cases, a data collection profile can be defined that collects information about the performance of services, but only when other aspects of the system are in certain configurations. For example, a query could involve analyzing the poor performance of Wireless Application Protocol (WAP) browser pages on the service provider's portal from certain locations. A WAP browsing session utilizes the IP layer, which runs over the RF layer to connect to a large IP network, then to a WAP Gateway, and through another IP network to the portal in question. Any one of these systems can cause performance degradation, but RF degradation is a frequently encountered problem. Therefore, it would be useful to be able to filter out the RF related data so that other possible sources for the poor performance may be uncovered. In this case, target wireless devices 400 are equipped with a data collection profile tuned to collecting data about very specific network conditions under which a WAP page load takes longer than a certain configured time. A request by the device for a WAP page load is the initiating trigger that causes data collection to begin. The data collection profile analyzes RF performance criteria such as frame loss, and automatically ignores events that occur in high loss situations. Since RF is typically the least reliable element in the network, this simple filter dramatically increases the value of the reported information by ensuring that the most frequent, and in this case irrelevant, cause of the delay in loading the WAP page is ignored, allowing the focus of the data to be on the higher layers. Similarly, the data collection profile could also ignore results that are gathered in scenarios where the IP service is not performing properly. Furthermore, since the wireless device contains software implementations of all the service layers, the data collection profile can be defined to compare information from any layer in order to qualify analysis operations.

In other cases, the data collection profile can be defined in a way that utilizes the parameters and status of other services on the wireless device to filter data collection. The wireless device has many different services running on it, such as voice calls, messaging, games, and cameras. These services interact both on the device (contention for resources such as processor and battery) and in the network (contention for bandwidth). The number of these services is rapidly increasing, and systems such as BREW and JAVA allow users to download their own selection of services, after the wireless device is in the user's possession. Thus, the growing number of potential interactions between these services, and the difficulty in analyzing all possible scenarios virtually guarantee that numerous failures will occur due to these service interactions.

For example, multimedia messaging service (MMS) systems use a model where messages are downloaded "in the background" to the user's wireless device to provide an "instant access" experience. An application like instant connect communication, also known as Push to Talk®, has very demanding requirements and expectations for the data channel. If an MMS download occurs during an instant connect communication session, the user's experience may be highly impacted, and the instant connect communication session may not perform as it should. The cause of this problem is invisible to the user, so no amount of interaction with customer care will resolve why instant connect communication sessions occasionally deliver very poor performance. To address this, a data collection profile can be defined with an initiating trigger that causes data collection to begin any time multiple applications or services are requesting data access simultaneously. Data collected in accordance with this profile enables the service provider to evaluate this and any other unanticipated contentions between services.

The data collection profile 600 also specifies various parameters concerning the handling and management of the data collected by the target wireless device 400. In the illustrated embodiment, the data collection profile 600 specifies a schedule according to which data gathered by the target device is to be uploaded to the SQP 201. In one implementation, the data collection profile 600 specifies a regular upload schedule, while other data collection profiles 600 may specify a one time upload, or real time upload of collected data. As with other aspects of the data collection profile 600, the upload schedule may be configured as necessary to suit the requirements of a particular application, operating system, or target device. The upload schedule may also be event driven, and it can be dependent on other factors including end user activity, available device battery life, and coverage status. For example, an upload may be skipped or delayed if the battery of target wireless device 400 is low, so as not to impact the user's experience significantly by decreasing the limited power available. Another example of how to preserve user experience is that the SQC 402 can build an activity pattern for the end user and adjust the upload schedule called out in the collection profile to an empirically derived low-usage time.

As noted above, the upload schedule can be based on the status of the target device. This status can relate to events or conditions of the target device itself. In addition, the status of the target device can also relate to the conditions of the network and the interaction of the target device within the network. For example, conditions of the network that can determine the upload schedule include the signal quality, high or low contention, non-roaming service, the existence of high speed data service, etc.

In another example, the RF environment is analyzed, and a target wireless device 400 can determine whether it is efficient for both the device and the network to upload a metrics package. For example, the amount of power a wireless device consumes for a data transmission depends upon the power level required to achieve adequate signal to noise ratio with a tower. A metrics package upload that is not time critical could be configured to only proceed if the power setting was below a preset maximum. This ensures that only minimal power was consumed for the operation. Further refinement of this model could include varying the preset maximum power based on the amount of time the upload has been delayed.

Further aspects of the data collection profile 600 include the ability to specify the device configuration with which the collection profile is compatible. As more and more user definable and downloadable features become available for wireless devices, it will become impossible for target device database 204C to have all information about every aspect of target wireless device 400. For example, users can download customized ringtones which make use of multiple different models for playback. If a suspected issue only appears to occur with devices that attempt to play back MIDI based ringtones that are over 30 seconds in length, a data collection profile could be defined and a target population of wireless devices selected, but the data collection profile would only activate if the target wireless device 400 had that particular configuration. In this case, while the data collection profile could be downloaded to a large population of devices that meet certain known criteria, it would only activate on the specific devices that use MIDI based ringtones over 30 seconds in length. The target wireless devices 400 that are not compatible with the data collection profile 600 can either ignore the data collection profile 600 or purge it from the memory of the target device. Among other things, this functionality helps to foreclose the gathering of irrelevant or extraneous data.

The data collection profile 600, in some cases, incorporates various other related functionalities. For example, one or more data collection profiles 600 include instructions that specify what action a target wireless device 400 must take if conflicting data profiles are in effect for that target wireless device 400. As another example, some data collection profiles 600 include instructions that specify the priority of the data collection activity specified therein relative to one or more others associated with the target wireless device 400. While multiple data collection profiles may be executed simultaneously, the need for prioritizing data collection profile execution may arise when there is higher urgency associated with the required data, or when the device is a match for the data collection requirements of multiple queries, and where the capacity of the target wireless device 400 is such that simultaneous collection of data streams, specified by two or more data collection profiles 600, cannot be achieved. To address this potential conflict, data collection profiles may be assigned a priority level, and once downloaded to the device, the relative priority levels are assessed by SQC 402 resident on the device and profiles may be executed according to their respective priorities. Once data is collected in accordance with the priorities specified in the data collection profile, a metrics package may be created and placed in the metrics archive of SQC 402. Such functionalities are exemplary only however, and various other rules concerning the management of data collection profiles 600 may also be used.

As mentioned previously, the data collection profile 600 can specify, include or otherwise incorporate other information, guidelines or rules concerning the data that is to be collected, as well as the conditions under which such data will be collected. Some data collection profiles 600 include disqualification criteria that enable a target wireless device 400 to self-select itself out of the data collection process. The data collection profiles 600 may also include or specify various parameters concerning the hardware and/or software contained in, or associated with, one or more target wireless devices 400.

As noted earlier, data collection profiles may be defined and stored for later use, or they may be created "on-demand" in response to certain business and technical needs. Additionally, in many cases, data collection profiles are automatically derived from particular data that is observed after analysis of metrics packages. They may also be generated when certain thresholds are reached or trends are identified. Thus, data collection profiles are derived from one or more characteristics of collected data, such as trend information, predefined data points or thresholds. As an example, a data collection profile may be configured to collect RF performance information such as dropped calls, but not radio data. An inordinate number of dropped calls in a particular geographic area would, in this example, serve as a basis for modification of the existing data collection profile, or generation of a new data collection profile, that is more specifically directed to radio data collection so as to enable evaluations and diagnoses concerning the relatively large number of dropped calls. Thus, even though radio data was not the initial focus of the data collection effort, trend or threshold analysis of the collected metrics packages provides a basis for further, related, data collection efforts.

V. Exemplary Query Definition Process

Figure 5:
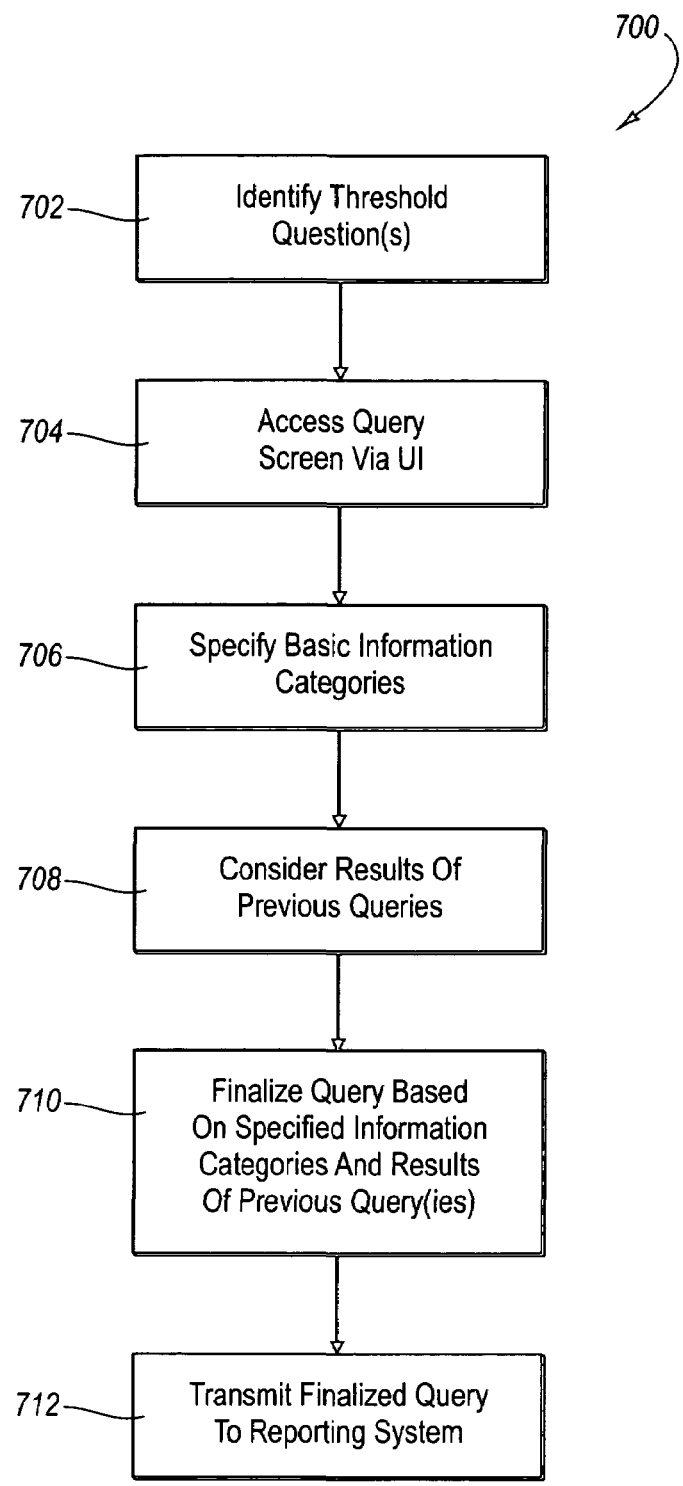
FIG. 5 is a flow diagram illustrating aspects of an exemplary process for formulating and rendering a query.

Directing attention now to FIG. 5, details are provided concerning a process 700 for defining a query such as may be used in the subsequent development of a data collection profile. As previously noted, a large number of business and technical issues can be identified and complete data collection packages, including data collection profiles and reports, can be developed and stored for later use. However, in some cases human intervention may be necessary to react immediately to a sequence of previously unknown events, and a network administrator may wish to create "on-demand" data collection profiles. The mechanism for creating data collection profiles on-demand is depicted in FIG. 5. At stage 702 of the process 700, the threshold question that is intended to be answered by the data collection effort is identified. As suggested in FIG. 5, the identification of the threshold question stage of the query process may be based on results of various other reports that have been generated concerning prior data collection efforts. In this way, the network administrator may be able to sharpen the query using previously developed knowledge. This, in turn, enhances development of the associated data collection profile. At this point, the threshold question may constitute nothing more than a plain language statement or question as to the particular data desired or question to be addressed.

Once the threshold questions have been identified, the process 700 advances to stage 704 where the network administrator accesses a query screen by way of a UI. The process 700 then advances to stage 706 where the network administrator employs the query screen to refine the threshold question, or questions, identified at stage 702. As discussed above in connection with FIG. 3, such refinement of the threshold question can be implemented by way of a query structure which uses trees, cascading menus and/or other structures and devices that enable a network administrator to refine the issue or issues to be addressed by the data collection effort.

A network administrator may specify a query that relates to a particular target device or type of target device, applications that are installed on the target device, services that are accessed in connection with a target device, as well as the RF performance or the performance of other systems in connection with which the target device is employed. As indicated at stage 708 of the process 700, this development of the query structure may if desired, consider and otherwise incorporate aspects of previously developed queries and/or the data and results obtained in connection with such queries.

Next, the process 700 advances to stage 710. At this stage, the network administrator finalizes the query based on the various information categories specified as well as, if applicable, the structure and/or results of one or more previously developed queries. At such time as the query has been finalized, the query is then transmitted to the reporting sub-system 208. The finalized queries can be stored in memory so that they can be readily retrieved and modified if desired. Further, the stored queries may also be retrieved and copied so as to streamline the development of future similar queries. In addition, such queries can be stored in a searchable database so that the network administrator can quickly determine if the query in which he or she is interested has already been developed. This arrangement likewise enables streamlined development of additional queries and data collection profiles. If the data necessary to satisfy the query has already been collected, the appropriate data and/or reports are returned to the network administrator. If not a CTR is generated by reporting sub-system 208 and communicated to tasking sub-system 204.

VI. Exemplary Tasking, Data Collection Profile Building and Target Device Selection Processes With attention now to FIG. 6, details are provided concerning a process 800 for generating, or building, one or more data collection profiles based on a CTR, selecting the target devices to receive the profile, and downloading the profile to the target devices. At stage 802 of the process 800, the CTR is received at the tasking sub-system 204. In some cases, a stage 804 is entered where development of the data collection profile is initiated in response to the receipt of trigger information concerning the occurrence of a trigger condition, or set of trigger conditions. Thus, some or all of a data collection profile may be generated automatically.

In yet other implementations, the data collection profile is generated when requested by a network administrator through the submission of a finalized query structure and a resulting CTR. In order to facilitate relatively rapid development of data collection profiles, the profile system can be configured to search for data collection profiles, such as in the profile database that match or are substantially responsive to the CTR. In this way, development of the new data collection profile can proceed fairly quickly. Moreover, in some cases, the network administrator may specifically direct that a particular data collection profile be modified in a particular way so that the modified data collection profile can be populated to various target devices. In this case, the discretion to use previously developed data collection profiles is taken from the profile system and given to the network administrator instead.

In either case, the process 800 then advances to stage 806 where the CTR is provided to the profile builder 206A. At stage 808, the profile builder 206A generates data collection directives, including rules and triggers, corresponding to the CTR and/or retrieves existing data collection directives, as applicable. With the data collection directives having been thus generated and/or retrieved, the process 800 advances to stage 810 where the profile builder 206A builds the data collection profile, or modifies an existing data collection profile, as applicable.

After the data collection profile has been selected, built or modified, as applicable, a determination must next be made as to which target device, or target devices, will be used to collect the data identified in the data collection profile. Accordingly, at stage 812 of process 800, the profile sub-system 206 notifies the tasking sub-system 204 of the device requirements in the data collection profile. Based on this information, the tasking sub-system 204 accesses the tasking database 204B and target device database 204C and, at stage 814, identifies the target device or devices whose characteristics are consistent with or otherwise correspond to the data collection profile. As mentioned previously, any number of device characteristics and conditions may be considered in the device qualification and selection process. In one embodiment in which wireless devices are used for data collection, the qualification process includes methods to determine which wireless devices are compatible with the data collection profile and which wireless devices must be disqualified from the data collection activity. To further qualify or disqualify wireless devices, consideration may be given to various other factors and characteristics such as the configuration of the device, physical properties such as available memory, location, and available battery life, usage properties such as account status, usage patterns, reported service problems and other usage history, interaction with or physical manipulation of the device by an end user, applications installed, and the profile of the end user.

The device information and characteristics used in the device targeting and selection process at stage 814 can come from many sources, including systems controlled by the network operator, such as an HLR or VLR, or from information provided to target device database 204C when the device initially activates SQC 402. Additionally, device information can be extracted from previous data collection activity and stored in target device database 204C, or it can be specifically collected for the purpose of populating device "targeting data" to the target device database through the use of a data collection profile whose data collection directives are focused on this data collection goal. An example of this is a data collection profile that is downloaded to every known device and directed to recording the identity of the base stations encountered by each device during a seven day period. At the end of the seven day period, the collected data is uploaded to metrics collector 202A and communicated to target device database 204C; the targeting data is then stored for later device targeting purposes. Thus, the device targeting and selection process would then have access to data concerning the identity of base stations encountered by the devices and the frequency with which those devices encountered a particular base station. Accordingly, a particular issue investigation may involve certain base stations, and the devices that can provide the best performance data concerning those base stations can then be targeted to collect data for that investigation. As a result of the process of collecting targeting data into target device database 204C and then using that data later for device selection criteria, a set of target devices can be identified and selected based on any metrics that are visible to SQC 402. These could include amongst others radio information and network information, real time device configuration included user downloaded software and content, user behavior history including access patterns and application usage patterns, device characteristics and configuration such as battery type or attached accessory devices.

Figure 6:
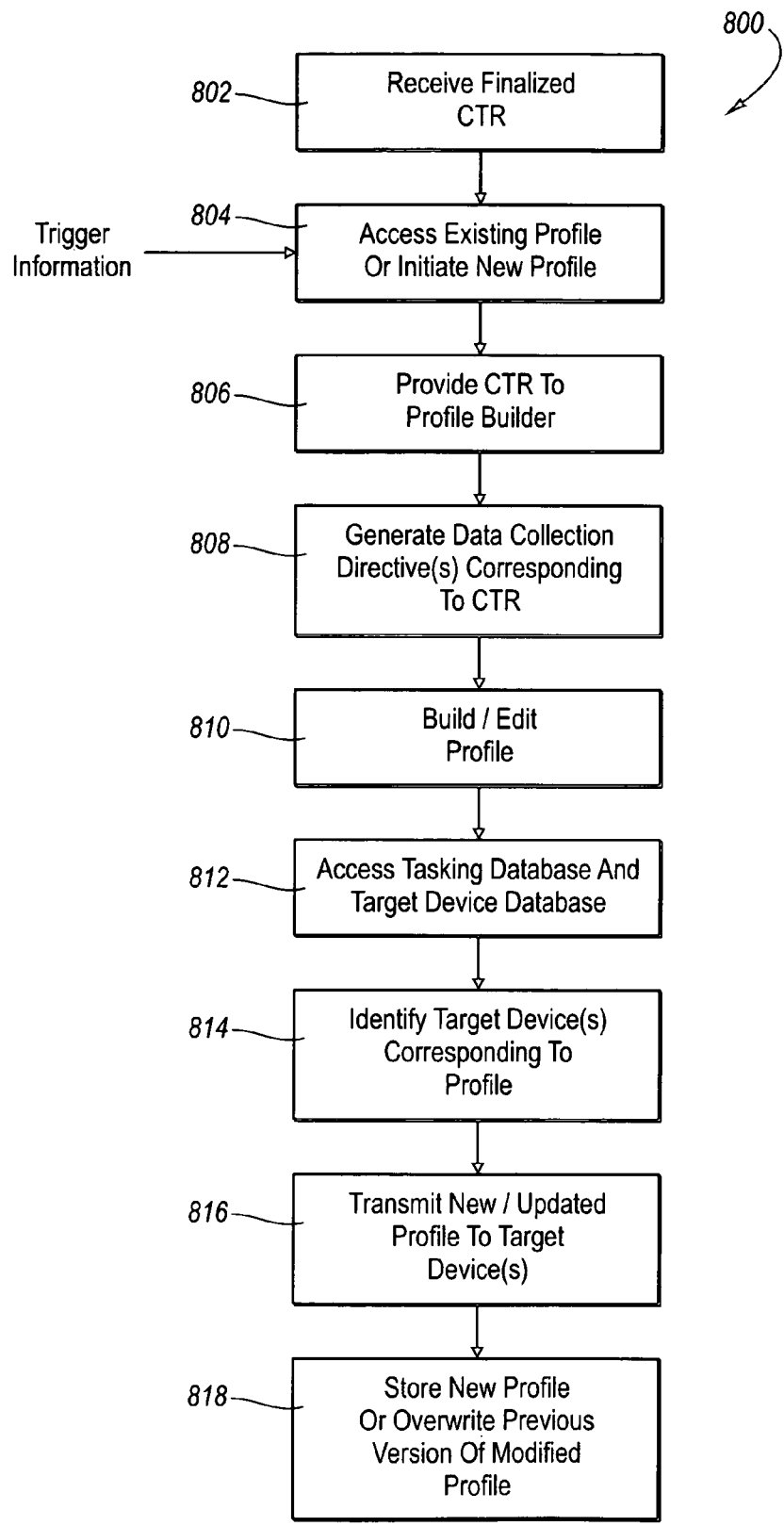
FIG. 6 is a flow diagram illustrating aspects of an exemplary process for generating a data collection profile.

The targeting process depicted at stage 814 of FIG. 6 can also automatically select devices that have previously encountered particular issues or problems. For example, if a population of devices has experienced a failure that is known to the data collection and management system 200, the reporting subsystem 208 may automatically cause a data collection profile to be generated in order to further explore the failure, and the devices that experienced the reported failure may be selected to receive the new data collection profile and participate in the data collection activity.

The device selection process may be iterative in that the initial results from the target device search may yield too many or too few compatible devices for example. In this case, the selection criteria can be modified incrementally to yield an appropriate target device population. In the example of encountered base stations discussed above, initial selection criteria might limit the devices selected to those that have encountered a specific base station in the last week. However, if this results in more devices than needed for data collection, another iteration of the selection process may specify selecting devices that have encountered the base station in the last two days, which could yield a more desirable number of devices for the data collection activity. In practice, this iteration will typically be done automatically by the tasking subsystem in the process of selecting devices.

Another source of data for the device targeting and selection process of stage 814 can be the device user's account information typically stored as part of the network operator's billing and provisioning system. This information identifies external properties of the end user and the end user's financial relationship with the network operator. This information can include corporate affiliation, billing plan and style, customer care history and events, and user demographic information. An example use of this information would be a query that monitored the performance of devices associated with a certain high value corporate customer. By tracking certain performance parameters such as dropped calls versus successful calls for devices with a specific corporate affiliation, the network operator could offer a guarantee of a certain level of performance, against a refund of a percentage of the monthly fee. In a market where perceived quality is a key driver for selection of a network operator' services, such a program could offer significant competitive advantages.

Furthermore, if the data collection profile specifies that data is to be collected concerning wireless calls made in the San Francisco Bay area, the tasking sub-system 204 will likely not select target devices whose account information indicates that the device resides in New York, unless the target device database 204C indicates that the device is or was recently active in the San Francisco Bay area. Note that in other cases, the tasking sub-system 204 accesses the profile developed by the profile system and the tasking sub-system 204 makes a determination as to the target devices to which the data collection profile will be transmitted. The results of this determination are then transmitted to the profile builder 206A so the device compatibility information can be included in the data collection profile.

After the target devices have been identified, the process 800 advances to stage 816 where the new or updated profile, as applicable, is transmitted to the identified target device(s). Profile transmission can occur in a variety of ways, including "pushing" the data collection profile to the target device, sending a message, such as an SMS, to the target device prompting it to retrieve the data collection profile, and preparing the data collection profile for download the next time the target device contacts SQP 201 such as when it uploads a metrics package. Such profile transmission to the SQC 402 residing on the target device(s) may be achieved using any of a variety of transport mechanisms and standards including Short Message Service ("SMS"), Hypertext Transport Protocol ("HTTP"), Hypertext Transport Protocol Secure ("HTTPS"), Wireless Application Protocol ("WAP") Push, IP-based Over-the-Air (IOTA) protocol, OMA/DM, or other protocols that are known in the art or that may be developed in the future.

The process 800 then advances to stage 818 where the data collection profile is stored on the target devices. When received by a target device, the collection profile is processed by SQC 402. In some cases, the data collection profile may be stored as received, or integrated with or take the place of previously received data collection profile(s). Factors that affect the how the data collection profile is processed by SQC 402 include, but are not limited to, the suitability of the device to the data collection requirements defined in the data collection profile, the relative priority of the data collection profile and any previously received profiles, and any explicit processing rules stated in the data collection profile. If processing the new profile by SQC 402 results in the data collection activity differing in any way from that specified in the data collection profile (e.g. if the device self-selects out of the data collection activity), SQC 402 may communicate back to SQP 201 the specifics of how and why the data collection activity differed.

The data collection profile can be transmitted to the target devices over a wireless or wireline connection. Because the data collection profile is relatively small, the transmission of the data collection profile proceeds relatively quickly and imposes minimal processing overhead on the target devices. Further, the population of target devices can be quickly redefined and data collection profiles quickly and easily downloaded in order to achieve data collection goals. Such iterative data collection processes are particularly useful in understanding transient error conditions because of the speed with which the data collection activity can be refined. Other data collection activities may contribute to more long term trend analyses. For example, thresholds might be set with regard to performance degradation that, when reached, would cause generation and download of a data collection profile to a population of wireless devices. In this manner, additional data collection can take place that would enable further exploration of the problem. Consequently, embodiments of the data collection and management system are highly flexible and data collection efforts can be quickly refined, reconfigured, and redirected in response to rapidly emerging network conditions or transient network conditions. In any case, statistical analyses performed in connection with the collected data can rapidly converge on a solution or answer to the question posed in connection with the query.

Unlike systems known in the art, the data collection and management system does not rely on the end users of the target devices to download the data collection profiles or to otherwise take action to enable the data collection process. Rather, as indicated above, the update of the target devices proceeds with minimal or no involvement on the part of the end user of the target device. Moreover, because each target device has been carefully qualified for participation in the data collection activity, the likelihood that any particular target device is not a valid candidate for a collection task is minimized. Thus, the collection of data as specified in connection with the data collection and management system 200 is performed quickly and easily by the target devices. Moreover, because the data collection profile is typically generated automatically in response to the occurrence of certain network conditions, the flexibility and speed with which the data collection management system 200 operates is further enhanced.

VII. Data Collection and Processing

The data collection function of data collection and management system 200 is based around one or more metrics which are generated by the software or hardware of wireless device 400 during its operation, and which are indicative of device and network performance. In one case, during the device manufacturing process, software commands are integrated into the operating system or other device software that cause metrics to be generated. As the metrics are generated, they are transformed into a data structure that is used to invoke SQC 402. As SQC 402 is presented with the generated metrics, it determines, based on the data collection profile(s) under its governance, whether a given metric is of interest at the time it is generated, and if so, it may store the metric into a buffer, where it is available to be included in a metrics package at some later time. The process of storing metrics into buffers is referred to as collecting metrics. However, it should be noted that in some cases, the generated metrics may be collected directly into a metrics package without having first been buffered. Otherwise, the process of metrics generation and buffering can occur constantly as part of the basic operation of wireless device 400. The control of this data collection logic is further described below in FIG. 7.

Another mechanism for generating metrics on wireless device 400 involves integrating the software for creating the metrics with application software that is embedded on or downloaded onto the wireless device; this is in contrast to integrating metric-generating commands with, for example, the operating system software of the wireless device during the device manufacturing process. During the development of the application software, an application programming interface (API) is used that allows the application developer to invoke SQC 402 with metrics generated by the application.

In one embodiment of the invention, when SQC 402 is presented with generated metrics, the SQC only interprets metrics in certain fields of the metrics data structure, and the remaining metrics are processed without any additional handling by the invention, but by techniques known in the art such as mark-up languages or variable length structures. The APIs reflect an in-memory data structure model that is generated from an XML description shared between the SQP operator and the application developer via external means. The common fields of the metrics data structure include a unique identifier (assigned by the SQP operator during the XML exchange process) and size fields, and allow new metrics to be or generated by new applications and without modification to SQC. Rules in the data collection profile direct assignment of metrics to buffers and link triggers to generated metrics by matching the identifiers in the common aspects of the metrics data structure. Data collection profiles can be implemented that define data collection rules, triggers and buffers for metrics requirements that arise after production and implementation of the SQC.

The extendable metrics model can be implemented both for third party applications integrated with the wireless communication device (such as browsers and or messaging applications) and for applications that are downloaded into virtual environments such as BREW or Java Virtual Machines. The virtual environment implements the programming interface for invocation by the application developed to the SQC enabled platform and functions as described above. Each time the interface is invoked the metric data structure is passed to SQC as a metric.

Virtual machines as described above provide another important point for generation of metrics. By specifically instrumenting the virtual machine to generate metrics, all applications that run on the virtual machine, whether utilizing programming interfaces as described above or not, are therefore instrumented for some degree of metrics generation. In the exemplary embodiment, the following aspects are instrumented to generate metrics, but substantially any aspect of the wireless device 400 functionality can generate metrics. Metric generation includes all error display routines allowing errors displayed to users to be captured by the data collection and management system for later analysis. Exceptions (software that violates fundamental principles of the target device operation) and task timers (timers that assure no single function can take all the processing resources and that detect infinite loop type errors) can generate metrics that indicate the state of the application when the error occurred. When captured and uploaded, the metrics can enable application developers to find errors in their software that occur in the filed and significantly speed problem diagnosis. User interface routines including screen refreshes and user input (button presses or other direct input) can generate metrics with the user input which include timestamps. When uploaded the user interface metrics can be used to understand how users interact with the application or device to help optimize application design and detect errors or points of confusion. These techniques can also apply to the entire wireless device 400, with the main operating system being instrumented instead of the virtual machine.

Figure 7:
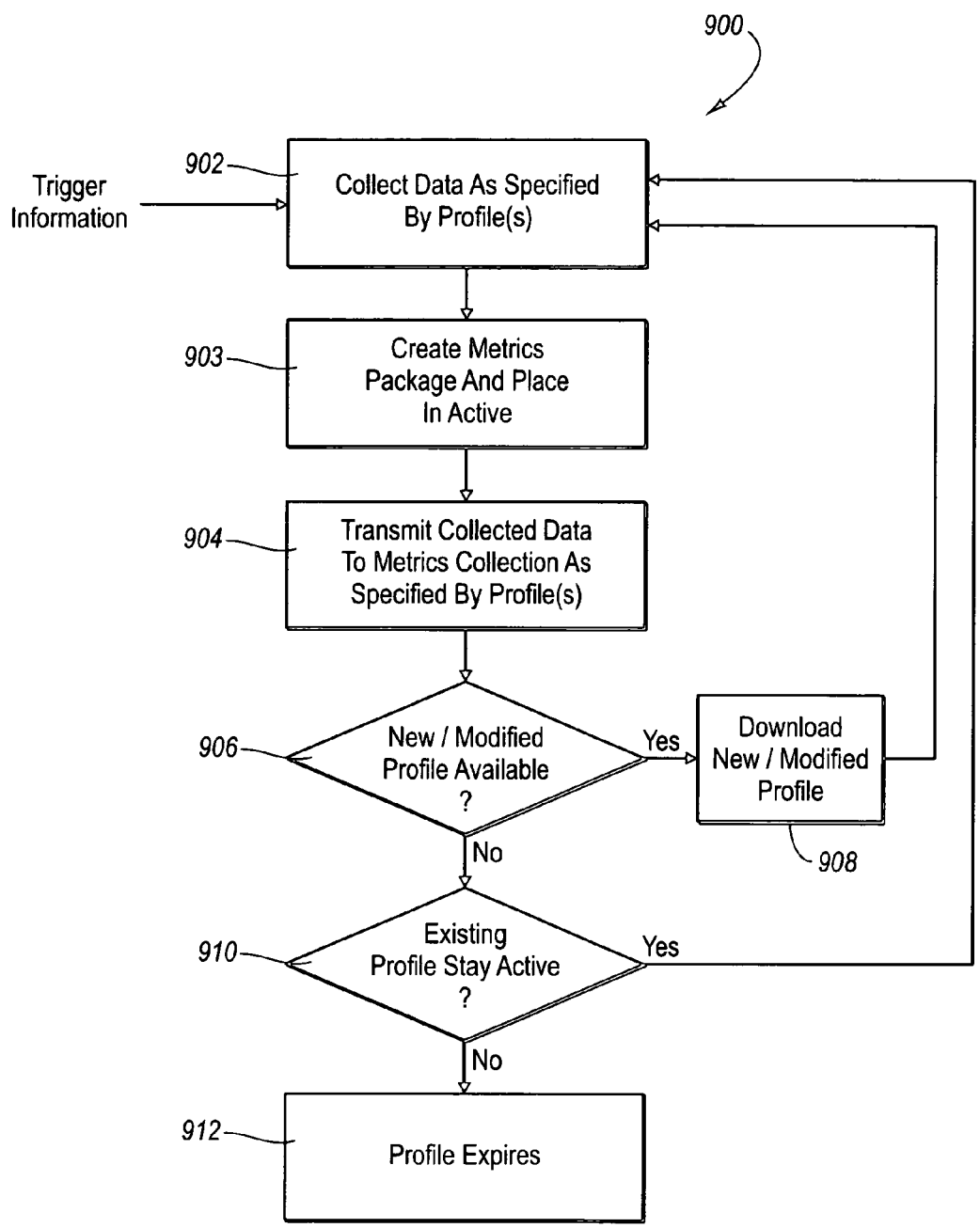
FIG. 7 is a flow diagram illustrating aspects of an exemplary process for collecting data in connection with a data collection profile.

With attention now to FIG. 7, details are provided concerning a process 900 performed by one or more target devices in connection with one or more data collection profiles. The process 900 begins with generation of metrics as part of the target device operation. At stage 902 of the process 900, data collection commences as specified in the data collection profile. As noted earlier, such data collection may commence in response to an initiating trigger, which could be as simple as the time of day or arriving at a geographical location, or it can be a complex combination of conditions, such as time of day, geographical location, an encounter with a particular error, or a combination of any of the above conditions coupled with use or non-use of a particular service or application. Once a profile is activated, data collection can begin and proceed continuously, and it can start, stop and restart to sample data based on data collection rules and triggers defined in the data collection profile. As noted earlier, during the data collection process, the metrics can be stored in a metrics buffer, or temporary memory, and may or may not ever be used. The metrics buffer is a circular buffer that stores N samples of data that is available for use, in creating a metrics package if necessary. Use of the buffered data allows a view of metrics generated before a particular error condition occurred, for example. This historical view, along with other metrics surrounding an error condition, can be vitally important in analyzing the problem. Thus, in response to a trigger, the buffered data can be captured in a metrics package along with any specified data arriving after the trigger was activated. In other cases, data can be collected and written directly to a metrics package without having first been buffered.

In any case, the target devices commence collection of data as specified in the data collection profile. For instance, each of the target devices may first examine the received data collection profile to check and verify whether the data collection profile is consistent with various characteristics of the target device such as the hardware and software contained on the target device and the various services with which the target device is authorized for use. In this way, target devices that are incapable of collecting the data specified in the data collection profile, or are otherwise unsuited to facilitate determination of a response to the query, may self-select out of the data gathering process. Alternatively, depending on the compatibility-related instructions contained in the data collection profile, rather than self-selecting out of data collection, the device may collect only a subset of the requested data and report this back to the metrics collector 202A along with the basis for the subset collection. Thus, the network administrator can be assured that the data ultimately collected and transmitted to metrics collector 202A comprises only data that is consistent with, and responsive to, the initially posed query.

In any case, once the data has been collected, the process 900 advances to stage 903 where the collected data is transformed by SQC 402 into a metrics package and placed in the metrics archive of SQC 402. Because device resources are by nature constrained, SQC 402 may employ methods for managing the priority of metrics packages stored on the device. For example, each time a metrics package is added to the metrics archive of SQC 402, SQC 402 calculates the total non-volatile memory used. If the total non-volatile memory required to store a new metrics package exceeds the amount of memory allotted to the metrics archive, SQC 402 reassesses the nature of the data in each stored metrics package. In one case, and under certain conditions, one or more metrics packages may be uploaded to metrics collector 202A to make room for the new metrics package on the device. Under certain conditions, SQC 402 may employ an algorithm for reviewing the stored metrics packages and selecting metrics packages for deletion. The algorithm may consider criteria including data storage allocations specified in a data collection profile, the nature and priority of the data, the timeliness of the data, the size of the new package to be stored, and the size of the package to be deleted. Selected metrics packages are then deleted from the metrics archive on the device until there is enough memory to store the new metrics package.

At stage 904 of process 900 the metrics package is transmitted to the metrics collector 202A at a time specified in the applicable data collection profile or profiles. As noted earlier, transmission of the metrics package may be a one time event, or may be performed on a periodic basis, or a recurring but irregular basis. It may also be transmitted as the result of an "on-demand" command sent to the device by the system, by a network administrator or the device user, or as the result of resource management by the SQC.

In one embodiment, the data collection profile may specify that the metrics package upload take place only upon the occurrence of a particular event or condition. When the condition for transmission is met, the collected data is transmitted to the metrics collector 202A. In some cases, receipt of the metrics package can generate notifications, such as email alerts and system alarms, and it can initiate reporting activity and/or additional monitoring or data collection activity. In other cases, if the condition is met, the current status of the end user's device may be further qualified before the upload activity commences to avoid overwhelming the capacity of the device or network or otherwise interfering with the end user's normal activity. If the condition is met, but the end user is engaged in an activity on the device that would be interrupted by the transmission of the metrics package, the transmission can be postponed to a later time and uploaded in accordance with a secondary set of rules. The metrics package can also be discarded altogether if, for example, the data is time-sensitive and the device is unavailable for connection to the network for an extended period of time or if SQC resource management practices force deletion to make room for priority metrics packages.

Finally, as indicated in FIG. 7, the process 900 advances to stage 906 where it is determined if a new or modified data collection profile is available for download by one or more target wireless devices 400. While this stage in the process is depicted in FIG. 7 as part of a sequential operation, determination of whether or not a new or modified profile is available for download is not contingent upon any other stage in the data collection process, and such new or modified data collection profiles may be created and prepared for download to selected devices at any time in response to changing network conditions, sudden emergence of a particular network condition, in response to generation of a new query, or various other factors. If a new or modified data collection profile is available, at stage 908 the available new or modified data collection profile is downloaded to the target wireless devices. Otherwise, at stage 910, in accordance with rules specified in the data collection profile, it is determined whether or not the existing data collection profile remains active; if so, it resumes data collection activities at stage 902. In many cases the existing data collection profile may stay on the device for any amount of time with or without modification and perform numerous instances of data collection and upload. However, if the existing data collection profile is determined to be obsolete at stage 910, the process advances to stage 912 where the existing data collection profile becomes inactive, and in some cases it is automatically deleted from the device.

Figure 8:
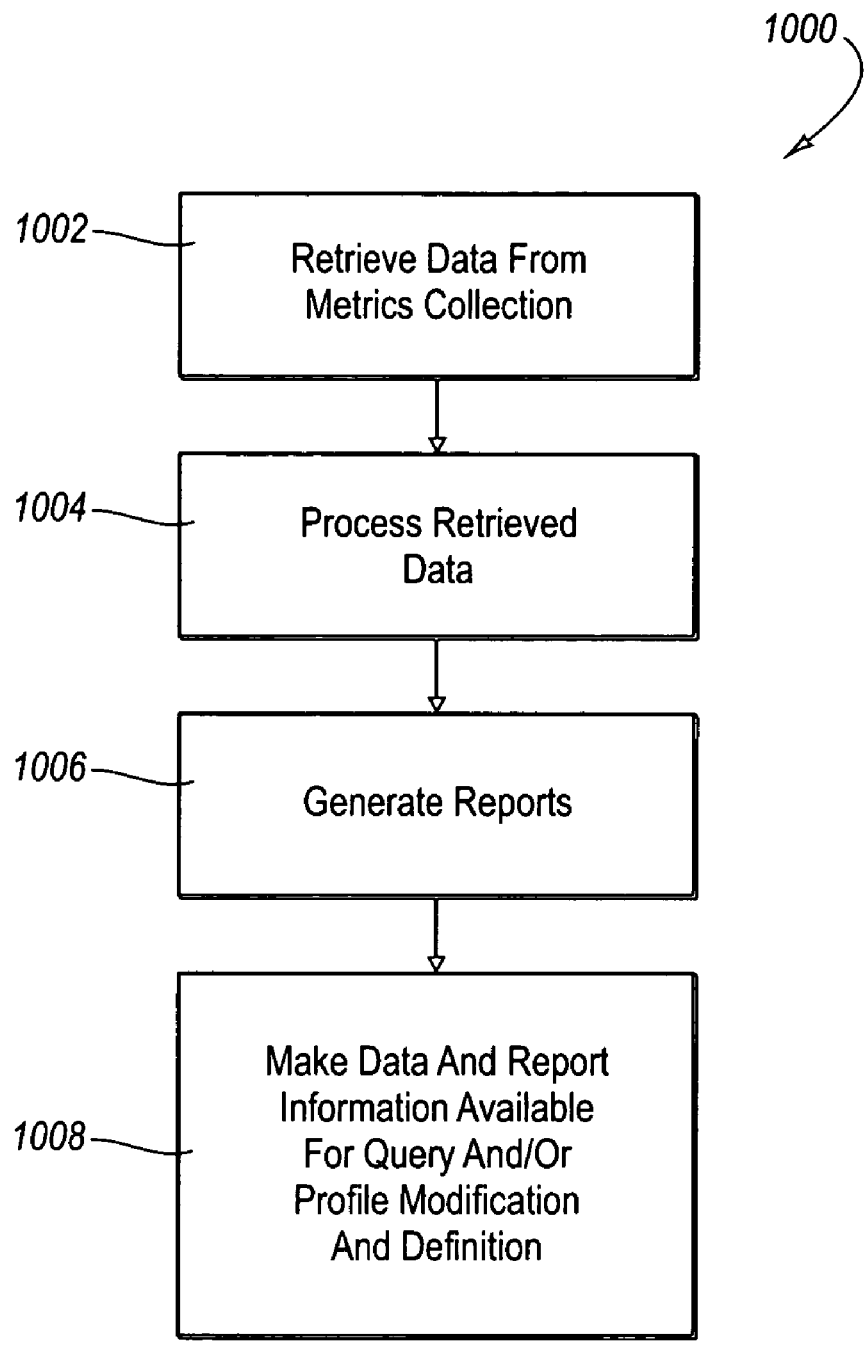
FIG. 8 is a flow diagram illustrating aspects of an exemplary process for using data collected in connection with a data collection profile.

Directing attention to FIG. 8, details are provided concerning aspects of a process 1000 for the processing and management of metrics packages. At stage 1002 of the process 1000, metrics package data is accessed from the reporting sub-system 208. Metrics packages can be indexed or otherwise related to the data collection profile and to other metrics packages so that all of the appropriate data can be accessed from the reporting system.

The process 1000 then advances to stage 1004 where the metrics package data is processed. Such processing can be virtually any type of manipulation or analysis of the metrics package data including statistical analysis. In some cases, the results of the analysis of the metrics package data are used to develop or refine existing or future queries, data collection profiles and/or to improve targeting accuracy of the tasking sub-system 204. After collection, and either before or in parallel to the report generation operations described below, the data may be augmented using automated calculations and additional information sources. Also, a plug-in server architecture could allow other applications to have direct feeds to the metrics packages.

Next, the process 1000 advances to stage 1006 where various reports are generated based on the processing of the metrics package. In the preferred embodiment of the invention, such reports will have been defined in advance in conjunction with a data collection analysis package as previously described herein and can be populated with analyzed data. Alternatively, on occasion custom reports may be created on demand by a network administrator. Finally, the process 1000 advances to stage 1008 where the data and report information is stored in reporting database 208C for further use and reference, exported to a third party reporting system, or otherwise made available for query, augmentation, and/or data profile modification and definition.

VIII. Definition and Use of Triggers

As noted earlier, the data collection processes performed in connection with the network and associated target devices involve the use of certain events, network conditions, trends, data points, and thresholds as a basis for the performance of other actions, such as generation, download or refinement of a data collection profile. In addition, embodiments of the invention provide for the definition and use of various types of triggers in conjunction with data collection profiles.

In the exemplary embodiment, a trigger is one or more conditions defined during an integration process with wireless device 400. Triggers enable SQC 402 to be invoked for the purpose of additional metric processing. Each trigger is associated with a specific identifier and defines a specific set of states that are visible to wireless device 400 software. When the SQC functionality is invoked, the trigger identifier is compared against triggers included in the downloaded profiles to determine the proper course of action. As such, inclusion of a trigger in a specific data collection profile effectively defines the conditions under which that data collection profile is to take a specified action.

In the exemplary embodiment, triggers may be included in the data collection directives of a data collection profile, and their inclusion causes SQC to initiate, abort, and terminate data collection activity as appropriate when the associated trigger condition is invoked by the wireless device 400. An alternative embodiment of triggers and data collection functionality is discussed later in section IX. A trigger invocation that matches the initiating trigger causes data collection activity to begin. A match of the terminating trigger causes the data collection activity to end, and a metrics package is then prepared for uploading. An abort trigger causes data collection activity to cease, and a metrics package is not prepared. In the example used earlier, initiation of an instant connect communication caused the SQC to be invoked with an "instant connect communication start" trigger event, which is matched against triggers in downloaded profiles and causes data collection activity to begin on the originating device. Receipt by the originating device of the 408 error would cause another trigger to be activated, and the SQC would match the event to a terminating trigger in the profile, cause data collection to stop and a metrics package to be prepared and uploaded. As can be seen, the inclusion of a trigger in a profile effectively selects the condition under which a specific action associated with that profile is to be executed. The trigger is not strictly within the profile, rather it associates specific profile actions (start, stop, abort) with a specific event on the device.

In another example, a trigger event may be the initiation of a voice call. In this case, commencement of a voice call is the initiating trigger invocation that causes the SQC to execute the data collection rules contained in the data collection profile resident on the device engaged in the voice call. In this example, the data collection profile associated the act of ending the voice call with termination of the data collection activity, and may also cause preparation of the metrics package for upload to the metrics collector. This data collection activity allows recordation of the metric activity specified for a call, and generation of a metrics package associated with each call occurring on the device.

The use of triggers provides for finely tuned data collection activity. By linking profile actions to events defined on the device, substantially any event can be effectively measured, including measurements leading up to it and trailing it in time. Consequently, important trend information and other indicators embodied in the collected data can be quickly identified and exploited, thereby enhancing the quality and usefulness of collected data. Any of a variety of triggers may be defined and employed. Accordingly, the scope of the invention should not be construed to be limited to any particular type, number, combination, implementation or use of triggers. Details concerning some triggers are provided below.

A basic form of one such trigger involves the definition or specification of a certain occurrence that causes the SQC to be invoked. As used herein, the term "occurrence" extends to occurrences or non-occurrences of specified things that define a specific identity of a trigger. When a determination has been made by the SQC that the defined occurrence has happened (for example by being invoked by the wireless device software with the specified trigger identity) or has failed to happen within a set timeframe, then one or more data collection activities may be performed by the SQC. In addition, the SQC can define certain metrics in certain states to cause invocation of a specified trigger identity. Substantially any metric in any state, or any sequence of metrics can be defined as causing invocation of a specific trigger identity. For example, the threshold trigger can be invoked by a monitored parameter that exceeds or falls below a particular threshold for a defined period of time, which can range from zero to an arbitrarily large number. One specific example is a threshold trigger that fires when a frame error rate metric exceed a predetermined value.

The trigger identities can be included in data collection profiles, and cause an associated action to occur. For example, to define a data collection profile that results in a metrics package with information about dropped voice calls, but that does not collect information about any other types of calls (successful or blocked), the following trigger associations could be used:

Initiate Trigger: Voice Call Start
Terminate Trigger: Voice Call Terminate Blocked
Abort Trigger: Voice Call Terminate In this example, the terminate trigger causes data capture to cease and a metrics package to be prepared, since data collected in relation to this trigger is the goal of the collection activity. The abort trigger indicates to the SQC that data collection should terminate but no metrics package should be prepared, since the data associated with this activity is not the focus of the collection goal.

A related type of trigger is a "domino" trigger, which is activated when a command is sent from SQP 202 to the SQC residing on the network node. In the example previously set forth in which 408 errors are being monitored, the terminating device in the example was unaware of the attempted communication session by the originating device, so a data collection activity would not have been triggered on the terminating device in this case. To ensure that important data related to the conditions surrounding the terminating device during the communication attempt is captured, a "domino" trigger is used. As illustrated above in the example regarding the 408 TIMEOUT message, a domino trigger occurs when SQP 201 causes a command, in the form of an SMS or other message type, to be sent to the SQC 402 on the terminating device, which causes an initiating trigger to activate, and an "on demand" data collection activity commences and/or a metrics package is prepared for upload. As part of the "on-demand" data collection activity, metrics may be selected from those existing in the buffer of the terminating device and other metrics may be gathered to complete the metrics package. In particular, in this example a data collection profile previously activated on the terminating device may cause the collection of data that is useful for the "on-demand" data collection activity at hand, allowing the domino trigger to gather data that was already being collected on the terminating device prior to the arrival the domino trigger. The metrics package may be uploaded immediately upon preparation, or at some other time specified in the data collection profile.

Figure 9:
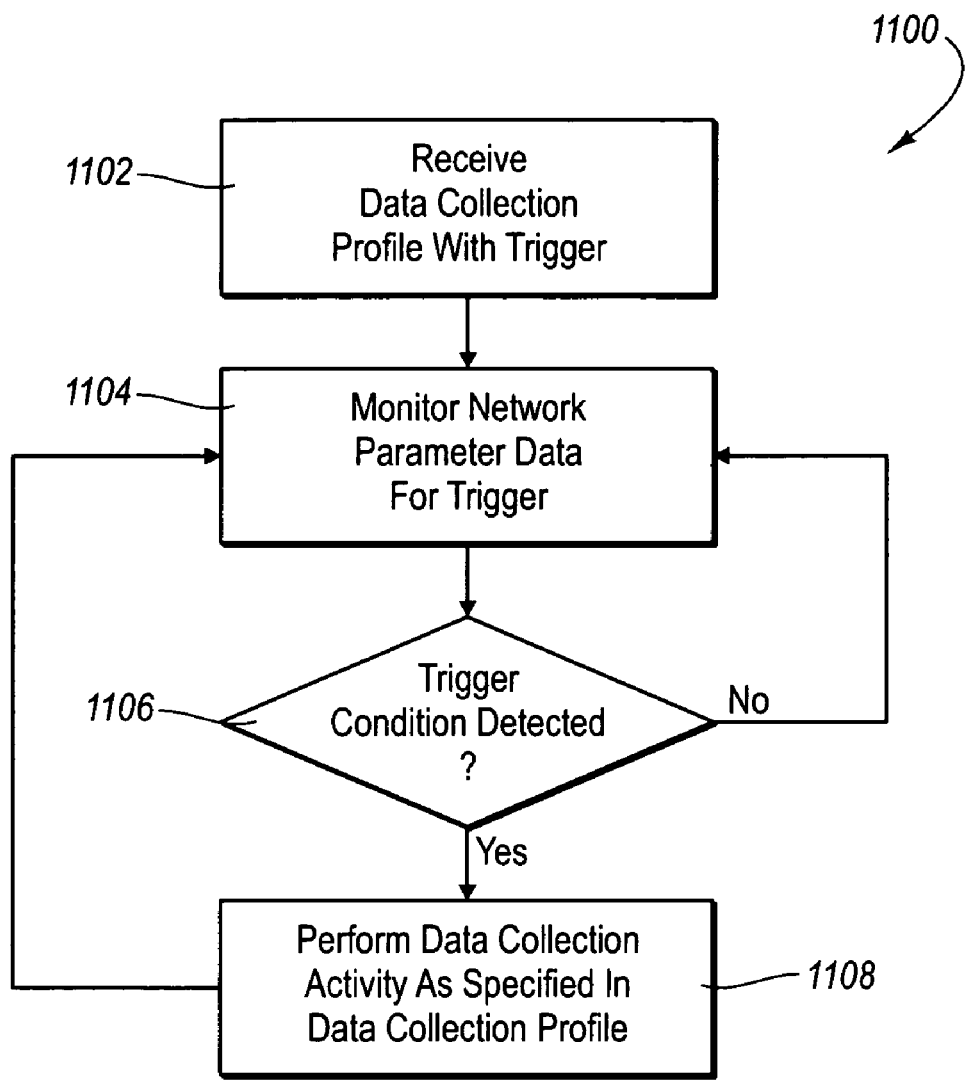
FIG. 9 is a flow diagram depicting an exemplary process for triggers activating data collection activities

With reference to FIG. 9, details concerning one example of a process, denoted at 1100, for data collection is illustrated. The process 1100 begins at stage 1102 where the SQC 402 on a wireless device, or devices, receives a data collection profile that specifies triggers. The triggers specified in the data collection profile may be configured so as to direct the SQC 402 to perform data collection activities upon invocation of the specified trigger. In the illustrated case, the SQC 402 on the wireless device engages in a monitoring process, at stage 1104, to identify activation of a trigger specified in the data collection profile. When the initiating trigger is activated, data collection begins. Once data collection begins, some or all of the monitored data may either be collected or it may be ignored, depending on the instructions contained in the data collection profile.

In the illustrated process, after an initiating trigger causes data collection to begin, data collection proceeds in accordance with instructions contained in the data collection profile until an abort or terminating trigger is detected at decision point 1106. For example, data collection instructions could specify a sampling of data at periodic intervals for a specified period of time. Data collection ceases when an abort or terminating trigger is activated.

Triggers can be defined that utilize any aspect of wireless device state in their implementation. By this mechanism, complex dependencies such as only collecting data when certain services are in certain states can be implemented. In a previous example, only collecting data for IP data calls made by the instant connect application can be implemented as a specific trigger definition which would only activate under the specific, constrained set of conditions.

Figure 10:
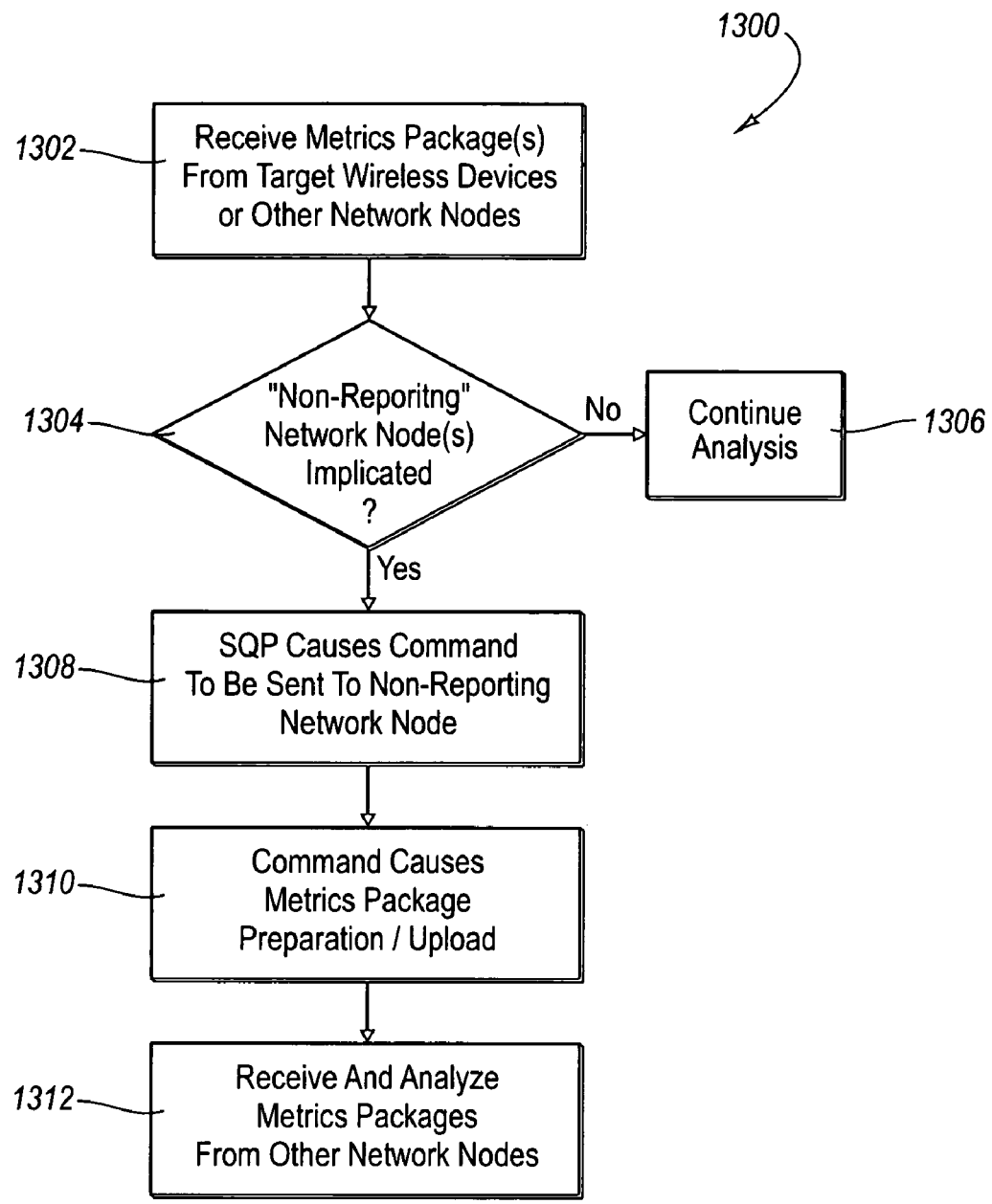
FIG. 10 depicts an exemplary process for invoking a domino trigger

Directing attention finally to FIG. 10, details are provided concerning a process 1300 involving the definition and use of a domino-type trigger. In the illustrated case, the process 1300 is performed from the perspective of the communications network. This arrangement affords the ability for network personnel to look at and evaluate an entire transaction between wireless devices of the communications network, rather than focusing solely on the portion of a transaction associated with a particular wireless device.

The process 1300 commences at stage 1302 where one or more metrics packages are received from one or more target wireless devices or other network nodes. Such data generally concerns one or more parameters of the communications network and/or associated wireless devices. The process 1300 then advances to a decision point at stage 1304 where a determination is made as to whether or not the received data in the metrics package(s) implicates another, "non-reporting" network node, such as a terminating device that is unaware that an originating device has attempted to communicate with it. If no other network node is implicated, the process 1300 proceeds to stage 1306, wherein further analysis may be performed.

If, on the other hand, the received data indicates that a "non-reporting" network node is implicated and may be able to contribute data that is important to the analysis of the transaction, the process 1300 instead advances to stage 1308. At this stage, SQP 201 causes a command to be sent to the "non-reporting", implicated network node. In this case, the command sent from SQP 201 is interpreted as a trigger that enables the implicated, non-reporting network node to collect the relevant data and send the data in a metrics package.

Thus, if a wireless device "A" sends a page to wireless device "B," but receives no response, wireless device "A" receives an error which activates a trigger that causes a metrics package to be uploaded to the metrics collector. However, because wireless device "B" may not be aware that the page was sent, the wireless device "B" is unaware of any error or problem having occurred, and would not have been triggered to upload a metrics package associated with the error. Accordingly, consideration of the entire transaction, or attempted transaction, between devices "A" and "B" is necessary to achieve a fuller understanding and appreciation of the problem.

At stage 1308 SQP 201 causes a command to be sent to wireless device "B". At stage 1310 the command is interpreted as an initiating trigger that in turn causes a data collection activity to occur, such as selection of metrics from the buffer of device "B", collection of any additional metrics needed, and preparation and upload of a metrics package. Next, the metrics package from wireless device "B" is received by the metrics collector at stage 1312, and additional analysis may be performed. At this stage, metrics packages uploaded by such other network devices in connection with the data collection profile are received and analyzed. The process 1300 may be performed once or repeatedly as part of an iterative analysis and resolution process.

IX. Scripted Device Profiles

In another embodiment of the invention, a scripted device profile, rather than a data collection profile, is used to direct processing of metrics generated by the target device. In this embodiment, instead of a limited set of fixed functions, the SQC is "scripted" with a fully functional programming language, allowing any algorithm for metric, trigger, and measurement handling to be defined by the scripted device profile. The additional flexibility significantly increases the number of scenarios that the data collection and management system of the invention can address because it allows even more of the details of metric collection, processing and management to be dynamically defined by the scripted device profile download rather than being coded into the SQC.

In this embodiment and in contrast to the previous embodiment, when metrics are generated as a result of an activity or transaction performed on the target device as previously described, metric processing, rather than being limited to collecting the metric, not collecting the metric, or causing invocation of a specified trigger identity, is significantly more flexible. More specifically, this embodiment of the invention allows complex processing on metric collection to be entirely defined by the downloaded scripted device profile. Metrics parameters and triggered functionality, which replace the data collection directives (rules and triggers) described in the previous embodiment, are defined in the scripted device profile and govern the processing of metrics. As before, the service quality client (SQC) is responsible for receiving and otherwise managing profiles.

With reference to FIG. 11, when a metric is generated on the wireless device 400, the SQC 403 is invoked which causes metrics processing element 404A to consult with metric parameters 404B specified in scripted device profile 404 to determine the proper handling of the metric. In many cases, no information is available in metric parameters 404A concerning the metric, so the metric is ignored, device operation continues, and metrics continue to be generated as part of the normal operation of wireless device 400.

However, if metric parameters 404A do specify handling of the metric, additional processing is then performed. The additional processing can take one of two forms. In the first form called filtering 404C, the metric is compared against parameters specified in metric parameters 404B. The parameters specify both the type of comparison and the values necessary for the comparison. As a result of this comparison a binary decision is made about whether the metric should be placed in one or more buffers 406 or ignored. The specific comparisons available are defined as part of the SQC implementation, and substantially any sort of comparison could be performed. Comparisons specified in metric parameters 404B may include simple binary decisions, such as "always collect this metric", or "collect if this metric meets this binary or numeric comparison." Other comparisons may include comparison of the metric with another metric or with another aspect of the wireless device 400 state. Even more complex comparisons involving multiple criteria and "pre-processing" to determine if a particular result has been achieved may be specified in the metric parameters. In general the comparisons specified in metric parameters 404B can be substantially any software functionality, but may also be limited to a relatively small number of commonly used actions defined at the time the SQC is implemented.

Having met criteria specified in the scripted device profile 404, the metric will be collected in one or more buffers 406. As in the previous embodiment, the common functions are fixed sized buffers for a specific number of metrics, with a simple rotating buffer model where a new metric may overwrite the oldest stored metric if the buffer is full. Other policies can include invoking triggered functionality 404D (discussed further below) if the buffer is full and a prioritized buffer where metrics collected under certain conditions overwrite metrics collected under different conditions. Substantially any buffer management model can be implemented in conjunction with the invention and specified as part of metric parameters 404B. In practice, a limited set of fixed functions may be implemented, and additional algorithms may be implemented as triggered functionality 404D. It should be noted that in some cases, the metric may be included in a metrics package without first having been buffered.

The second form of metric processing also utilizes the comparison functionality described, but instead of collecting the metric upon a positive result as defined for filtering, a previously downloaded script, referred to herein as triggered functionality 404D is invoked to direct further metric processing.

Triggered functionality 404D is a significant departure from the previous embodiment of trigger and data collection profile functionality. Triggered functionality 404D is a full-featured computer language, i.e., it is software that directs the actions of the wireless device 400 processor, so any software functionality can be implemented on the wireless device 400 in connection with data collection, management and analysis. As a result of being invoked by a metric comparison, triggered functionality 404D assumes control of metric processing. As previously noted, triggered functionality can perform substantially any software function on wireless device 400, and it has access to the invoking metric, all of the buffers in which metrics may be stored, additional state information on the device, metric packages, and upload functionality. In the previous embodiment which utilized data collection profiles and triggers, there was a limited set of actions that could be executed in response to a trigger invocation, and the triggers each had defined functions that were performed in response to their activation. In this embodiment, use of scripted device profiles and triggered functionality allows the result of any metric comparison as defined above to act as a trigger, and allows complete flexibility as to the subsequent action performed (the "triggered functionality") after a trigger is activated. More specifically, triggered functionality 404D can cause generation of new metrics, and it can modify metrics parameters 404B to change the criteria and processing directives contained in the scripted device profile 404. Triggered functionality 404D can further copy, modify and otherwise process buffer 406 contents and can transform the resulting data into metrics packages 408 for later upload. The triggered functionality can perform uploads and cause new scripted device profiles or other software code to be downloaded to wireless device 400 and executed thereon.

Triggered functionality 404D is contained within the scripted device profile 404 in this embodiment. Any of a number of models known in the art for enabling a software downloadable model on wireless device 400 can be prove effective as a management model for triggered functionality 404D. These models include virtual machines (as implemented by Java for example) and actual machine language (as implemented by the BREW environment for example) running in a prescribed environment. In addition, numerous commercial packages are available today to perform "over the air" firmware upgrades, effectively allowing any software to be downloaded and added to the existing software on wireless device 400 and subsequently be invoked as triggered functionality.

As a complete computer language, triggered functionality 404D can implement virtually any software functionality possible on the device. In this embodiment, the triggered functionality 404D is implemented in native device code, so it has access to all state and functionality of the wireless device 400. However, certain implementations may have more limited access to device state and functionality and still perform substantially the same role.

In addition to the triggered functionality that is invoked by metric comparisons, a set of special events on wireless device 400 are defined as special triggers 412 and can similarly invoke triggered functionality 404D. Amongst others, when a scripted device profile 404 is first downloaded to wireless device 400, a special trigger 412 activates triggered functionality 404D to execute profile start up—in some cases to configure triggers and metric parameters. When wireless device 400 is powered on or off, reset, or a processor exception occurs, a special trigger 412 is activated. These special triggers may be implemented to cause triggered functionality to be invoked by such actions as application invocation, user actions or other activities that would not otherwise naturally cause generation of metrics. Special triggers 412 may be invoked by substantially any other event on the device that may prove of interest for later analysis.

Because of the general nature of the capability of the triggered functionality 404D, many other aspects of the data collection functionality (such as abort triggers or termination triggers) become different triggered functions rather than special functions. As noted earlier, the scripted embodiment of SQC discussed in this section allows complete flexibility of what actions, if any, are taken when one of these events occurs, significantly increasing the number of interesting measurements that can be effectively performed by the data collection and management system of the invention.

X. Telecommunication Devices and Computing Environments

As indicated herein, embodiments of the present invention may be implemented in connection with a special purpose or general purpose telecommunications device, including wireless and wireline telephones, other wireless communication devices, or special purpose or general purpose computers that are adapted to have comparable telecommunications capabilities. Embodiments within the scope of the present invention also include computer-readable media for carrying or having computer-executable instructions or electronic content structures stored thereon, and these terms are defined to extend to any such media or instructions that are used with telecommunications devices.

By way of example such computer-readable media can comprise RAM, ROM, flash memory, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is;

1. A method for collecting data associated with a communications network that includes a plurality of devices, the method comprising:
   receiving, at a data collection agent of target device, a data collection profile comprising a series of executable commands which are executed by the data collection agent, the data collection profile defining data that is to be collected, a condition under which the data is to be collected, and conditions under which the collected data is to be transmitted, the target device having been selected from among the plurality of devices to receive the data collection profile based on a determination that the target device has at least one characteristic that corresponds to the data collection profile;
   executing, by the data collection agent, the data collection profile;
   determining, by the data collection agent at the target device, that a condition defined by the data collection profile has occurred;
   collecting, by the data collection agent, data at the target device in response to the condition and as specified by the data collection profile;
   transforming the collected data into a metrics package; and
   transmitting the metrics package to a remote server according to the conditions defined in the data collection profile.

2. The method as recited in claim 1, wherein the data relates to services of the communications network that are provided to a user of the target device.

3. The method as recited in claim 1, wherein the data relates to characteristics of a software stack of the target device that communicates with various network layers of the communications network.

4. The method as recited in claim 1, wherein the target device has received multiple data collection profiles, the method further comprising reconciling the execution of the multiple data collection profiles based on priorities associated therewith.

5. The method as recited in claim 1, wherein collecting the data at the target device is performed also in response to a configuration of the target device being compatible with collection of the data.

6. The method as recited in claim 5, wherein characteristics that indicate that the target device is compatible with the collection of the data include at least one of:
   the ability of the device to collect metrics specified in the profile;
   the ability of the device to respond to the triggers specified in the profile;
   the RAM storage on the device available for metrics collection;
   the persistent storage on the device available for storage of metrics packages;
   the processing power of the device; and
   the general ability of the device to execute the specified data collection profile.

7. The method as recited in claim 5, wherein the data collection profile defines a configuration of the target device that is compatible with the collection of the data.

8. The method as recited in claim 5, wherein, at a later time when the configuration of the target device is not compatible with the collection of the data:
   the triggering condition occurs; and
   the data is not collected or only a subset of the data is collected.

9. The method as recited in claim 1, further comprising purging the data collection profile from the target device upon expiration of the data collection profile.

10. The method as recited in claim 1, further comprising purging specific data collection directives within the collection profile from the target device upon expiration of the data collection directive.

11. The method as recited in claim 1, wherein specified collection profiles or data collection directives within the collection profile become effective or disabled during one or more valid times.

12. The method as recited in claim 1, wherein specified collection profiles or data collection directives with the collection profile are effective or disabled after a period of time.

13. The method as recited in claim 1, wherein the triggering condition comprises a particular time.

14. The method as recited in claim 1, further comprising:
   receiving another data collection profile at the target device; and
   in response to determining, by the target device, that said other data collection profile is not applicable to the target device, purging said other data collection profile.

15. The method as recited in claim 1, wherein the target device has been selected from among the plurality of the devices to receive the data collection profile by accessing a target device database to determine that the target device has at least one characteristic that corresponds to the data collection profile.

16. The method as recited in claim 1, transmitting the data to the remote server comprises selecting a time for transmission based on a status of the target device.

17. The method as recited in claim 16, wherein selecting a time for transmission is performed according to at least one of:
   rules defined by the data collection profile; and
   a requirement of an application of the target device or an operating system of the target device, or another requirement of the target device.

18. The method as recited in claim 17, wherein the rules are defined to minimize the impact of the data transmission on the communications network.

19. The method as recited in claim 17, wherein the rules are defined to minimize the impact to the user.

20. The method as recited in claim 17, wherein the rules define multiple transmission rules which:
   are attempted sequentially until the data is transmitted; and
   are ordered to first attempt transmission when the transmission would result in the least impact to the user and communication network.

21. The method as recited in claim 1, further comprising processing a collection profile at the target device to locally make one of the decisions that include:
   complete adoption of the collection profile;
   partial incorporation of the collection profile; and
   rejection of the collection profile such that the target device is self-selected out of collection.

22. The method as recited in claim 21, further comprising the target device communicating specifics of the decision that has been made back to the remote server.

23. The method as recited in claim 1, wherein transmitting the data to the remote server is performed in response to a specific event defined in the data collection profile.

24. The method as recited in claim 1, wherein a plurality of other target devices also transmit data to the remote server.

25. The method as recited in claim 1, further comprising generating a domino trigger.

26. The method as recited in claim 1, further comprising:
   storing a plurality of metrics packages at the target device; and
   in preparation for storing another metrics package:
      evaluating memory resources of the target device to determine whether sufficient memory is available to store the other metrics package; and
      if sufficient memory is not available, performing an action with respect to previous stored metrics packages to make sufficient memory available.

27. The method as recited in 26, wherein the action is guided by information provided within the data collection profile.

28. The method as recited in claim 26, wherein the action is guided by one or more of:
   data storage allocations;
   the nature and priority of data in the new metrics package;
   the nature and priority of data in previous stored metrics packages;
   the timeliness of the data in previous stored metrics packages;
   the size of the new package to be stored; and
   the size of previous stored metrics packages.

29. The method as recited in claim 1, further comprising, in response to a terminating triggering condition and as specified by the data collection profile, terminating collection of the data.

30. The method as recited in claim 29, further comprising, in response to the terminating triggering condition, archiving selected data within a random access memory (RAM) buffer at the target device into a metric package.

31. The method as recited in claim 1, wherein collecting data at the target device comprises storing metrics in a circular RAM buffer.

32. The method as recited in claim 31, wherein the size of the RAM buffer is configurable by the data collection profile.

33. The method as recited in claim 31, wherein the target device includes different RAM buffers associated with different metrics.

34. A method for collecting data associated with a communications network that includes a plurality of devices, the method comprising:
   receiving, at a data collection agent of target device, a data collection profile defining data that is to be collected, a condition under which the data is to be collected, and conditions under which the collected data is to be transmitted, the target device having been selected from among the plurality of devices to receive the data collection profile based on a determination that the target device has at least one characteristic that corresponds to the data collection profile;
   determining by the data collection agent, at the target device that a condition defined by the data collection profile has occurred;
   in response to the condition and as specified by the data collection profile, collecting data at the target device;
   analyzing the collected data in order to remove any irrelevant data;
   transforming the analyzed data into a metrics package; and
   transmitting the metrics package to a remote server according to the conditions defined in the data collection profile.

35. A method for collecting data associated with a communications network that includes a plurality of devices, the method comprising:
   receiving, at a data collection agent of target device, a data collection profile defining data that is to be collected, a condition under which the data is to be collected, and conditions under which the collected data is to be transmitted, the target device having been selected from among the plurality of devices to receive the data collection profile based on a determination that the target device has at least one characteristic that corresponds to the data collection profile;
   determining at the data collection agent if the data collection profile is relevant to the conditions of the target device;
   purging the data collection profile at the data collection agent if it is determined that the data collection profile is not relevant to the conditions of the target device;
   determining by the data collection agent, at the target device that a condition defined by the data collection profile has occurred;
   in response to the condition and as specified by the data collection profile, collecting data at the target device;
   transforming the analyzed data into a metrics package; and
   transmitting the metrics package to a remote server according to the conditions defined in the data collection profile.

* * * * *

UNITED STATES PATENT AND TRADEMARK OFFICE
CERTIFICATE OF CORRECTION

PATENT NO. : 7,609,650 B2
APPLICATION NO. : 11/175857
DATED : October 27, 2009
INVENTOR(S) : Roskowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twelfth Day of October, 2010

David J. Kappos
*Director of the United States Patent and Trademark Office*